(12) United States Patent
MacMillan et al.

(10) Patent No.: US 7,181,985 B2
(45) Date of Patent: Feb. 27, 2007

(54) CONDUIT INSPECTION APPARATUS AND METHOD

(75) Inventors: John Stewart MacMillan, Glasgow (GB); Patrick Gerard McBride, Dumbarton (GB); John Gibb MacMillan, Helensburgh (GB); Colin Main, Hamilton (GB); David Kennedy, Blanefield (GB); Kenneth Cameron, East Killbride (GB)

(73) Assignee: Breval Technical Services Limited, Glasgow (GB)

( * ) Notice: Subject to any disclaimer, the term of this patent is extended or adjusted under 35 U.S.C. 154(b) by 0 days.

(21) Appl. No.: 11/138,647

(22) Filed: May 27, 2005

(65) Prior Publication Data

US 2006/0266134 A1   Nov. 30, 2006

(51) Int. Cl.
*H04N 7/18* (2006.01)
(52) U.S. Cl. .................................................. 73/865.8
(58) Field of Classification Search .............. 73/865.8; 134/168 C
See application file for complete search history.

(56) References Cited

U.S. PATENT DOCUMENTS

| | | | | |
|---|---|---|---|---|
| 3,793,808 A | * | 2/1974 | Ackermann ................. | 95/197 |
| 4,401,696 A | | 8/1983 | Wood ......................... | 427/236 |
| 4,537,136 A | | 8/1985 | Douglas ...................... | 104/138 |
| 4,541,566 A | * | 9/1985 | Kijima et al. ................ | 239/224 |
| 4,567,514 A | | 1/1986 | Morgan et al. .............. | 358/100 |
| 4,722,001 A | | 1/1988 | Rohrich et al. .............. | 358/100 |
| 4,983,167 A | | 1/1991 | Sahota ........................ | 606/194 |
| 5,072,487 A | | 12/1991 | Walton ........................ | 15/406 |
| 5,113,885 A | | 5/1992 | Ramsey ...................... | 134/167 |
| 5,142,990 A | | 9/1992 | Leonard .................... | 104/138.2 |
| 5,164,826 A | | 11/1992 | Dailey ........................ | 358/100 |
| 5,423,230 A | * | 6/1995 | Olander et al. ............. | 73/865.8 |
| 5,565,633 A | * | 10/1996 | Wernicke .................... | 73/865.8 |
| 5,586,580 A | * | 12/1996 | Fisk et al. ..................... | 138/98 |
| 5,913,977 A | | 6/1999 | Nichols ....................... | 118/712 |
| 5,971,404 A | | 10/1999 | Stoves ....................... | 280/6.154 |
| 6,123,027 A | | 9/2000 | Suyama et al. ........... | 104/138.2 |
| 6,180,169 B1 | | 1/2001 | Nichols ........................ | 427/236 |
| 6,390,105 B1 | | 5/2002 | Ramsey ....................... | 134/167 |
| 2001/0010104 A1 | | 8/2001 | Couchman et al. ..... | 15/104.061 |

(Continued)

FOREIGN PATENT DOCUMENTS

DE        4015112        9/1991

(Continued)

*Primary Examiner*—Robert Raevis
(74) *Attorney, Agent, or Firm*—Fleshner & Kim, LLP

(57) ABSTRACT

There is disclosed a conduit inspection apparatus of a type adapted to be located within and transported along a conduit such as a duct, and a method of inspecting a conduit.

In one embodiment, the conduit inspection apparatus (10) comprises a body (18) adapted for location within a conduit such as a duct (14), a centralization assembly (16) for centralizing the body (18) within the duct (14), a transportation assembly (20) for transporting the body (18) along the duct (14), and a data coupling (24) for data communication between the body (18) and a control station (22). In a preferred embodiment, the apparatus (10) includes a fluid applicator (78a) for supplying a fluid to a surface of the duct (14), the fluid applicator (78a) including a rotary member in the form of an atomiser (166) for imparting a force on the fluid to direct the fluid towards a surface of the duct (14).

43 Claims, 15 Drawing Sheets

U.S. PATENT DOCUMENTS

| | | | |
|---|---|---|---|
| 2002/0102136 A1 | 8/2002 | Holland | 405/184.1 |
| 2004/0207394 A1* | 10/2004 | Harthorn et al. | 324/216 |

FOREIGN PATENT DOCUMENTS

| | | |
|---|---|---|
| DE | 4012606 | 11/1991 |
| DE | 4142237 | 6/1993 |
| DE | 19620239 | 7/1997 |
| DE | 19641887 | 11/1997 |
| DE | 19651433 | 12/1997 |
| DE | 19836730 | 3/1999 |
| DE | 19823398 | 12/1999 |
| DE | 19855175 | 6/2000 |
| DE | 20020056 | 4/2001 |
| DE | 10215325 | 10/2003 |
| EP | 0511934 | 11/1992 |
| EP | 07955360 | 9/1997 |
| EP | 1245692 | 10/2002 |
| FR | 2613029 | 9/1988 |
| FR | 2791413 | 9/2000 |
| GB | 2226865 | 7/1990 |
| GB | 2255814 | 11/1992 |
| WO | WO 97/02452 | 1/1997 |
| WO | WO99/13260 | 3/1999 |
| WO | WO 01/84039 | 11/2001 |

* cited by examiner

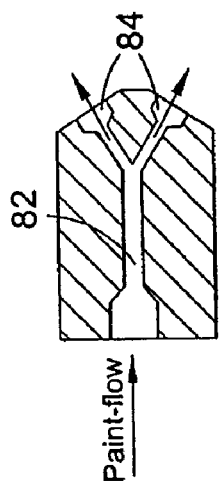
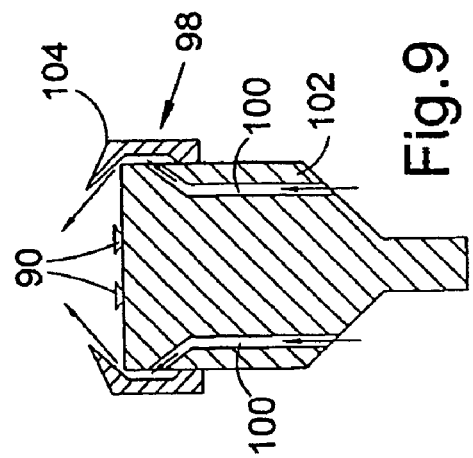
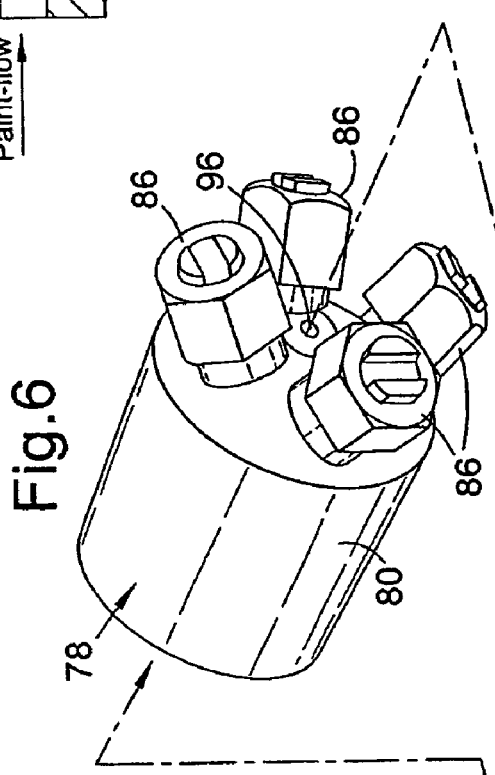
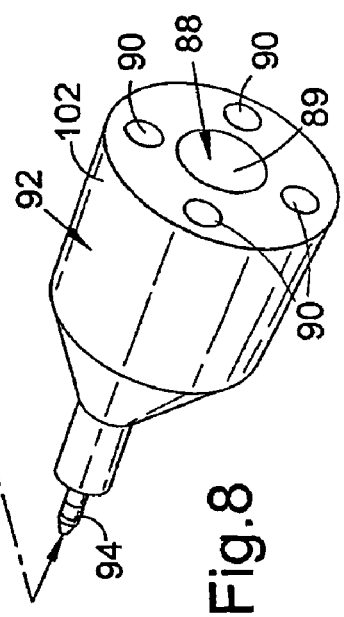
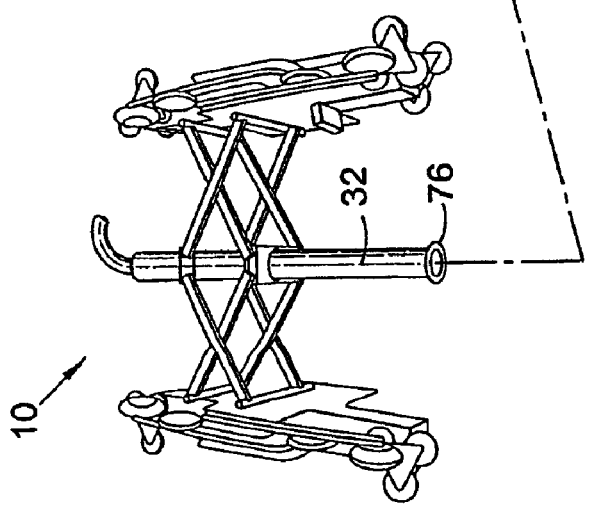

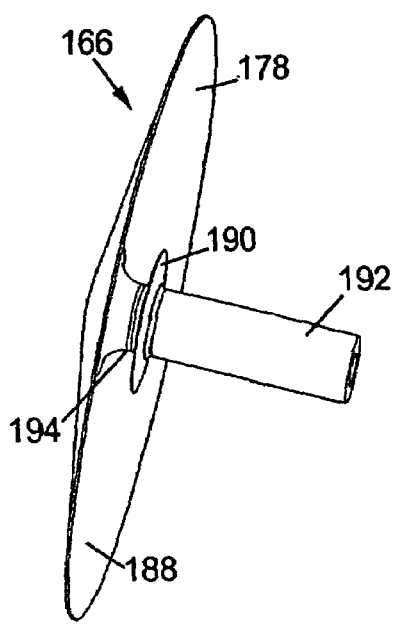
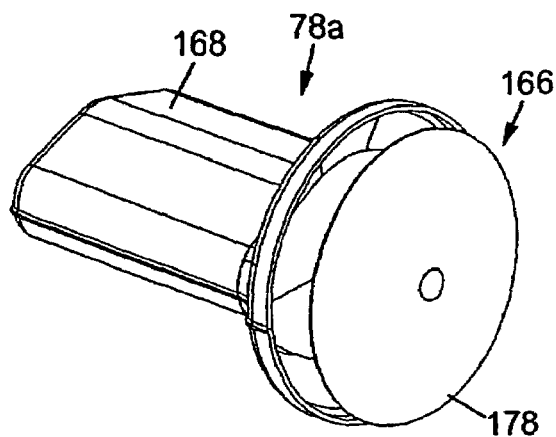
Fig. 27  Fig. 28
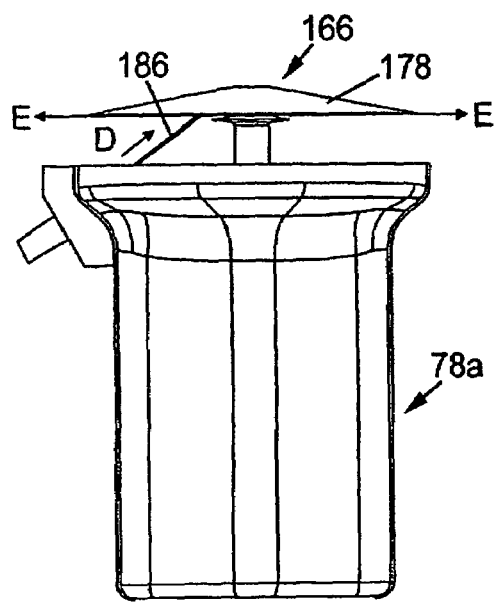
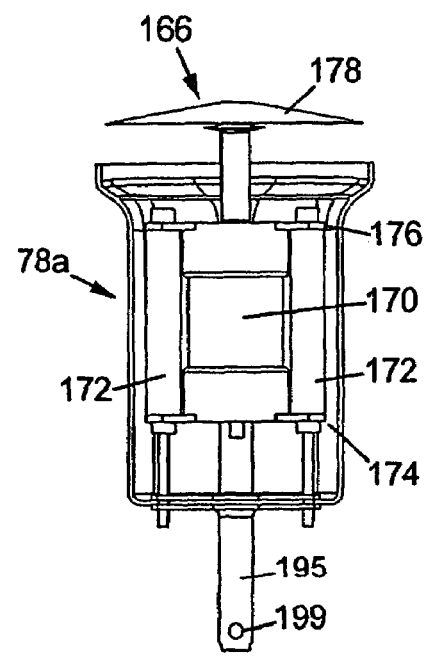
Fig. 29  Fig. 30

CONDUIT INSPECTION APPARATUS AND METHOD

FIELD OF THE INVENTION

This invention relates to a conduit inspection apparatus and to a method of inspecting a conduit. In particular, but not exclusively, the present invention relates to conduit inspection apparatus of a type adapted to be located within and transported along a conduit such as a duct.

BACKGROUND OF THE INVENTION

Conduit inspection apparatus comprising a body adapted to be transported along a conduit for cleaning, monitoring and other purposes are known, for example from German patent publication Nos. DE 19641887 (Siemens A G), DE 19823398 (Sauter) and DE 19620239 (Bauer et al), as well as U.S. Pat. No. 6,180,169 (Nichols) and U.S. Pat. No. 5,113,885 (Ramsey).

The apparatus disclosed in these and other publications suffer from a number of disadvantages, including relative complexity, likelihood of damage or deterioration in performance of components of the apparatus in use, inability to be used within conduits of a wide range of types and internal dimensions, inability to perform a wide range of functions and a lack of data obtainable using the apparatus.

It is amongst the objects of embodiments of the present invention to obviate or mitigate at least one of the foregoing disadvantages. In particular, it is amongst the objects of embodiments of the present invention to provide an improved conduit inspection apparatus and method.

SUMMARY OF THE INVENTION

According to a first aspect of the present invention, there is provided conduit inspection apparatus comprising:

a body adapted for location within a conduit;

a centralisation assembly for centralising the body within the conduit;

a transportation assembly for transporting the body along the conduit; and a data coupling for data communication between the body and a control station.

The apparatus may be used for inspection of conduits of various types and internal dimensions. The apparatus has a particular utility in the inspection of ducts such as those used for ventilation in buildings, however, the apparatus may also be used in alternative ducts, pipelines such as gas or fluid pipelines, drains, sewers and the like. It will be understood that the conduit may be of any shape in cross-section, and is typically square, rectangular or circular, but that the apparatus is suitable for use in conduits of any shape due in part to the dimensions of the apparatus and the ability of the centralisation assembly to centralise the body within the conduit.

It will also be understood that references herein to inspection and to inspection apparatus are to an apparatus suitable for location and movement along a conduit for a number of different purposes, as will be described in more detail below.

The apparatus may comprise a fluid applicator for supplying a fluid to the conduit, in particular, for applying a fluid to a wall/surface of the conduit. This may facilitate supply of a specialist cleaning fluid to the conduit, such as a disinfectant/antibacterial or bacteria resistant fluid, for cleaning an internal wall/surface of the conduit and/or coating the conduit with such a fluid; or a coating fluid, such as a paint, sealant, mastic or the like onto an internal wall/surface of the conduit, applied as part of a maintenance or repair procedure. In an example, a hazardous material encapsulation coating may be applied, for encapsulating hazardous materials such as asbestos. In an embodiment, the fluid applicator may be adapted to apply an electrostatic paint onto the conduit wall, polarised to be attracted towards the conduit. This may be achieved by oppositely polarising the conduit.

The fluid applicator may include a rotary member, in preferred embodiments, an atomiser, for imparting a force on the fluid to direct the fluid towards a wall/surface of the conduit. The atomiser may be adapted for rotation to atomise the fluid according to the centrifugal principle. The atomiser may comprise a main disc or ring for imparting a force on the fluid to direct the fluid onto a wall/surface of the conduit. The atomiser may also include a secondary shield disc or ring, spaced from the main disc along a shaft of the atomiser, the secondary disc serving to prevent passage of fluid along the atomiser shaft. This may prevent any fluid from entering a motor coupled to the shaft, or indeed other parts of the fluid applicator.

At least part of the fluid applicator, preferably the rotary member, may be movable between a deactivated or stowed position, and an activated or deployed position for applying a fluid to a wall/surface of the conduit. The fluid applicator may comprise a housing or the like for the rotary member, for housing the rotary member when in the deactivated position. This may assist in ensuring that the rotary member is not damaged, for example, during handling of the apparatus prior and/or subsequent to location in the conduit; and in avoiding injury to an operator. This may be of utility where the rotary member is an atomiser, as the atomiser may have a relatively sharp edge (to facilitate passage of fluid from a surface of the atomiser in use). Said part of the fluid applicator may be biased towards the deactivated position by a biasing force, for example, by a spring, and may be adapted to be urged towards the activated position against the biasing force. Said part of the fluid applicator may be selectively urged towards the activated position. For example, the apparatus may comprise at least one piston/ram for urging said part of the applicator to the activated position. Where the fluid applicator includes a rotary member, the apparatus may be arranged such that the piston is only caused to urge the rotary member to the activated position when the rotary member is rotated. For example, in embodiments of the invention, the rotary member may driven by a motor and the piston may only urge the fluid applicator to the activated position when the motor is activated.

The fluid applicator may be coupled to the body and located such that centralisation of the body within the conduit centralises the fluid applicator, to provide optimum distribution of fluid on an internal surface(s) or wall(s) of the conduit.

The fluid applicator may be releasably coupled to the body, to allow removal of the applicator for maintenance/cleaning purposes, or to facilitate replacement of the applicator with an alternative tool. The fluid applicator may further comprise at least one fluid nozzle or outlet for supplying a fluid to the conduit. The nozzle may be adapted for the supply of any desired cleaning or coating fluid. Alternatively, the fluid applicator may include separate nozzles for cleaning fluid and coating or other fluid, respectively.

The nozzle/outlet may be adapted to direct fluid onto the rotary member for subsequent application to a wall/surface of the conduit. The nozzle may conveniently be coupled to the housing of the fluid applicator, and at least part of the nozzle may be removable or releasably mounted, to facilitate cleaning and maintenance.

Alternatively, the nozzle may be adapted to apply fluid directly onto a wall/surface of the conduit. The nozzle may comprise an integral part of the body, or a separate component adapted to be coupled to the body. The nozzle is preferably rotationally fixed, but may alternatively be adapted for rotation, for example, about an axis of the apparatus, either in response to supplied fluid or by actuation, such as mechanically by movement of the body through the conduit through a gear or other mechanical assembly, or electrically/electronically in response to a control signal. The fluid applicator may include a plurality of nozzles each oriented or directed in a different direction. For example, the fluid applicator may include two, three or more nozzles, each nozzle mutually angularly spaced to facilitate a 360° coverage of an internal surface of the conduit. The nozzles may be angled with respect to a direction of travel or axis of the apparatus, and may be inclined at an angle of between 30° and 90°. In one embodiment, the fluid applicator comprises four mutually equally spaced nozzles, each inclined with respect to a direction of travel or axis of the apparatus.

The apparatus may further comprise at least one imaging device, such as a camera, for viewing the inside of the conduit. The imaging device may be connected to the data coupling for outputting an image of the inside of the conduit. This may allow a real-time image of the inside of the conduit to be viewed, facilitating control of the apparatus and determination of conditions within the conduit to, amongst other things, locate any corrosion, determine whether cleaning or maintenance is required, monitor cleaning/maintenance procedures and to monitor passage of the body within the conduit. The apparatus may comprise a first imaging device for viewing in one direction along the conduit, and at least one further imaging device for viewing in a second, opposite direction along the conduit. This may facilitate viewing of the conduit both in front and behind the apparatus. Alternatively, the apparatus may comprise an imaging device mounted for movement relative to the body. This may facilitate viewing of the conduit ahead of and behind the apparatus, relative to a direction of travel.

The apparatus may further comprise at least one and preferably a plurality of light sources for illuminating the conduit. The light source may comprise a low power, robust source such as a light emitting diode (LED), but may alternatively comprise a filament or fluorescent light source.

The apparatus may further comprise a cleaning apparatus or tool, such as one or more fixed or moveable abrasive brush, blade, tooth, scraper or combination thereof for cleaning an internal surface of the conduit. The tools may be adapted to be releasably coupled to the body.

The apparatus may further comprise a self-cleaning assembly for maintaining at least part of the apparatus clean. Preferably, the self-cleaning assembly includes a passage for supplying a medium, such as air or another gas, to the apparatus. This may facilitate provision of a curtain of air/gas to protect the apparatus from soiling by cleaning or coating fluid, or by other materials present within the conduit dislodged during movement of the body. The self-cleaning assembly has a particular utility where the apparatus includes an imaging device, by preventing a viewing surface such as a lens of the imaging device from becoming coated or covered. The self-cleaning assembly may comprise at least one nozzle for supplying a medium to maintain the apparatus clean. Preferably, the self-cleaning assembly includes a plurality of nozzles mounted for directing jets of medium onto or near the part of the apparatus to be maintained clean, such as the imaging device. The self-cleaning assembly may also comprise a baffle or deflector for shaping the flow of cleaning medium.

The centralisation assembly may be moveable between retracted and extended positions for centralising the body within the conduit. Preferably, the centralisation assembly includes a plurality of extendable legs adapted to be brought into contact with an internal wall of the conduit. The assembly may comprise a first set of extendable legs for centralising the body in a first plane and a second set of extendable legs for centralising the body in a second plane. The second plane is angled (non-parallel), typically perpendicular, to the first plane. This may allow centralisation of the body within conduits of a wide range of shapes and dimensions, but particularly in square or rectangular conduits.

The centralisation assembly may comprise a plurality of pairs of legs coupled together in a scissors configuration for movement between retracted and extended positions. The assembly may also include a plurality of wheels, rollers, runners or the like for rolling/sliding contact with an internal surface of the conduit, to aid passage of the apparatus.

In an alternative embodiment, the centralisation assembly may include one or more sensors for detecting the location of the body with respect to the conduit, and may be adapted to adjust the position of the body to maintain the body centrally within the conduit.

Preferably, the centralisation assembly is pneumatically actuated, but may alternatively be hydraulically, electrically or otherwise actuated. The apparatus may include a fail-safe mechanism for de-activating the centralisation assembly to a fail-safe position. This may facilitate retrieval of the body, for example, in the event of the apparatus becoming lodged in the conduit. The fail-safe position of the centralisation assembly may be the retracted position. The fail-safe mechanism may include a valve for bleeding pressure from the centralisation assembly in the event of a shut-down. The valve may be adapted to bleed pressure only on shut-down, or to provide a constant pressure bleed.

The apparatus may comprise one or more bumper, slider or the like on the body, for facilitating passage of the body along the conduit. Alternatively, the apparatus may comprise a roller device having a plurality of wheels mounted on a bogie or pivot arm/plate, for assisting passage of the body within the conduit. The bumper/roller device facilitates passage over obstructions such as seams, flanges, nuts, bolt or rivet heads and the like within the conduit. The apparatus may comprise a plurality of roller devices, each of which may include at least three wheels mounted on a bogie. The wheels may be off-centre from a pivot about which the bogie is coupled to the body for rotation about the body. The roller device may form part of the centralisation assembly.

The transportation assembly may comprise a cable, wire or the like coupled to the body for moving the body along the conduit. The body may be adapted to be pulled along the conduit using the cable. Alternatively, the cable may possess sufficient rigidity to enable the body to be pushed along the conduit using the cable.

In preferred embodiments, the body may comprise or be coupled to a self-propelling transportation assembly for moving the body along the conduit, which may comprise driven wheels, tracks or the like.

The data coupling may be provided together with or may form part of the transportation assembly. In particular, the data coupling may form at least part of a cable of the transportation assembly. The apparatus may further comprise one or more of an electrical connection; a cleaning fluid supply; a coating fluid supply; a data cable; a pneumatic power supply; and a hydraulic power supply. These may take the form of wires, cables or tubes, as appropriate, which may be provided as a single bundle such as in an umbilical cable. The umbilical cable may include a connector for facilitating quick connection of all the cables/tubes in the bundle to the body. Alternatively, the cables/tubes may be provided separately. The data coupling may be a wireless coupling and the apparatus may comprise a general packet radio service (GPRS) system for data transfer between the apparatus and the control station. Power for the wireless coupling may be provided through an electrical connection to the apparatus or onboard batteries.

The apparatus may further comprise one or more measuring devices for measuring one or more internal dimensions of the conduit. The measuring device may comprise a potentiometer for providing an electrical signal indicative of a position of the centralisation assembly. This may allow the width and height of the conduit to be determined. Alternatively, the measuring device may comprise a laser or other sensor.

The apparatus may also comprise a device for sensing distance travelled by the body, which may be associated with the transportation assembly. For example, the device may measure the length of cable reeled in or paid out, or an odometer for directly measuring distance travelled by the body. The apparatus may also include an onboard inclinometer, gyroscope, accelerometer and/or gradient sensor or the like for determining the angle of the body (indicative of the body traversing an incline or decline in the conduit) and speed of travel, and a sensor such as a compass for determining direction of travel of the body. This may facilitate generation of a map of the conduit. The apparatus may also or alternatively comprise a GPS receiver, to facilitate tracking of movement of the apparatus, optionally in three dimensions, and thus generation of a map.

The apparatus and/or control station may include appropriate software for generating a map according to parameters of the conduit supplied by or from the apparatus.

The apparatus may further comprise an environmental sampling device, which may include one or more of a swab, a fluid sampling device and an air/gas sampling device.

According to a second aspect of the present invention, there is provided a conduit inspection assembly comprising:

conduit inspection apparatus; and a control station for controlling operation of the apparatus;

the conduit inspection apparatus comprising:

a body adapted for location within a conduit;

a centralisation assembly for centralising the body within the conduit;

a transportation assembly for transporting the body along the conduit; and a data coupling for data communication between the body and the control station.

Further features of the conduit inspection apparatus are defined above.

The control station is preferably adapted to be located externally of the conduit. The control station thus provides an interface for controlling operation of the apparatus. The control station may be adapted to send and receive data to and from the apparatus via the data coupling.

The control station may comprise a dedicated processor, but preferably forms part of a personal computer (PC), for controlling the supply and receipt of data to and from the apparatus. The control station may be adapted for one or more of storing data received from the apparatus such as data regarding the dimensions of the conduit and images of the conduit; controlling speed of travel of the body along the conduit; controlling the supply of cleaning and/or coating fluid to the apparatus; controlling the supply of pneumatic or hydraulic fluid to the apparatus or power supply to an activation device of the apparatus; controlling supply of power to the imaging device and/or light source; and controlling operation of the centralisation and/or transportation assembly.

The transportation assembly may comprise a winch for reeling a cable coupled to the body, for moving the body within the conduit. The control station may control operation of the winch to thereby control movement of the body.

According to a third aspect of the present invention, there is provided a method of inspecting a conduit, the method comprising the steps of:

locating a body within the conduit;

centralising the body within the conduit;

coupling the body to a control station by a data coupling; and translating the body along the conduit.

The method may further comprise viewing an image of the conduit using an imaging device.

The method may further comprise cleaning the conduit by removing any material adhered to the internal wall of the conduit. This may be achieved by mechanically removing materials using an abrasive tool and/or by jetting cleaning fluid onto the internal surface of the conduit.

The method may further comprise applying a coating to the internal surface of the conduit. The coating may be a paint, sealant or mastic.

The method may further comprise controlling centralisation of the body within the conduit and transportation of the body along the conduit via the control station.

According to a fourth aspect of the present invention, there is provided conduit inspection apparatus comprising:

a body adapted for location within a conduit;

a centralisation assembly for centralising the body within the conduit;

a transportation assembly for transporting the body along the conduit;

a data coupling for data communication between the body and a control station;

at least one fluid nozzle coupled to the body for supplying a fluid to the conduit;

an imaging device for viewing the inside of the conduit;

a light source for illuminating the conduit;

a self-cleaning assembly for cleaning at least part of the apparatus; and at least one measuring device for measuring at least one dimension of the conduit.

According to a fifth aspect of the present invention, there is provided conduit inspection apparatus comprising:

a body adapted for location within a conduit;

at least one fluid nozzle coupled to the body for supplying a fluid to the conduit;

an imaging device for viewing the inside of the conduit; and a self-cleaning assembly for cleaning the imaging device.

BRIEF DESCRIPTION OF THE DRAWINGS

Embodiments of the present invention will now be described, by way of example only, with reference to the accompanying drawings, in which:

FIG. 5 is a view of the conduit inspection apparatus similar to FIG. 3;

FIG. 6 is an enlarged perspective view of a nozzle assembly forming part of the conduit inspection apparatus of FIGS. 1–5;

FIG. 7 is a longitudinal sectional view of part of the nozzle assembly of FIG. 6;

FIG. 8 is an enlarged perspective view of an imaging device forming part of the conduit inspection apparatus of FIGS. 1–5;

FIG. 9 is a longitudinal sectional view of the imaging device of FIG. 8, also showing a self-cleaning assembly of the apparatus;

FIG. 10 (presented on the same sheet as FIG. 1) is an enlarged view of an umbilical cable forming part of the conduit inspection apparatus of FIGS. 1–9;

FIG. 27 is an enlarged view of a rotary member forming part of the fluid applicator of FIGS. 23 to 26;

FIGS. 28–30 are front left perspective, plan and partially sectioned plan views of the fluid applicator of FIGS. 23–26 in an activated position;

DETAILED DESCRIPTION OF THE DRAWINGS

Figure 1:
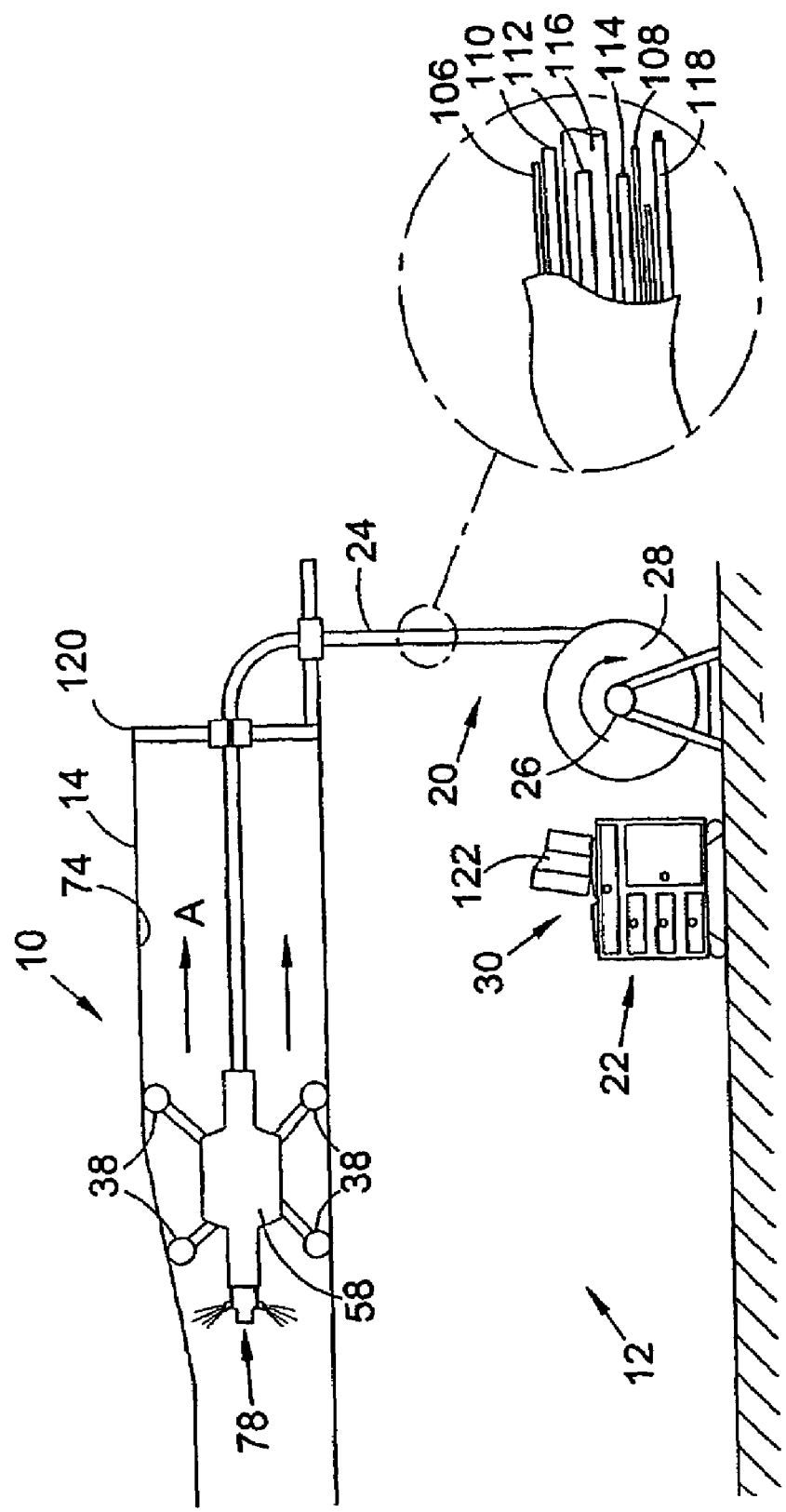
FIG. 1 is a schematic illustration of a conduit inspection apparatus and a conduit inspection assembly incorporating the conduit inspection apparatus, in accordance with an embodiment of the present invention, the apparatus shown in use.

Referring firstly to FIG. 1, there is shown a schematic illustration of a conduit inspection apparatus indicated generally by reference numeral 10, the apparatus forming part of a conduit inspection assembly indicated generally by reference numeral 12. The assembly 12 is shown in FIG. 1 in use during inspection of a conduit such as a ventilation duct 14, of the type typically used for ventilation in buildings. The inspection apparatus 10 is transported along the duct 14 in the direction of the arrow A, to carry out inspection, cleaning and maintenance procedures, as will be described in more detail below.

Figure 2:
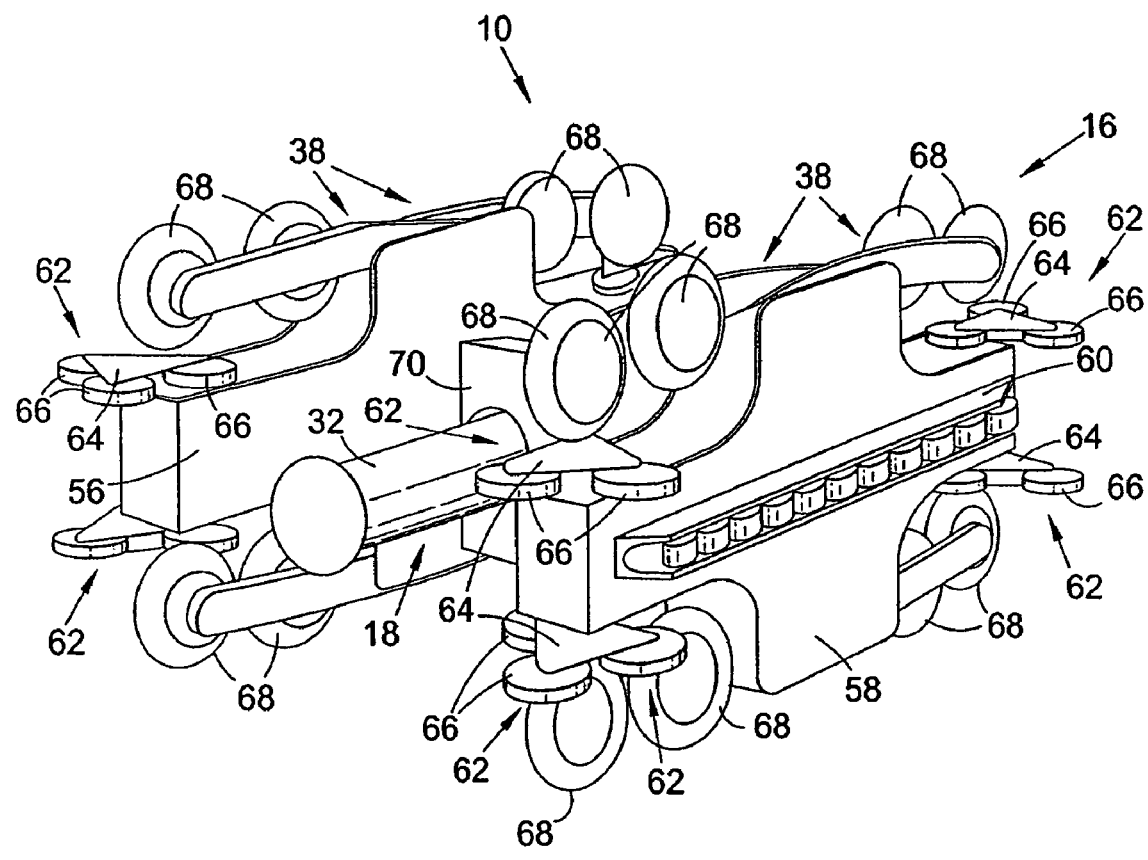
FIG. 2 is an enlarged, detailed front right perspective view of the conduit inspection apparatus of FIG. 1, shown prior to activation of a centralisation assembly of the apparatus.
Figure 3:
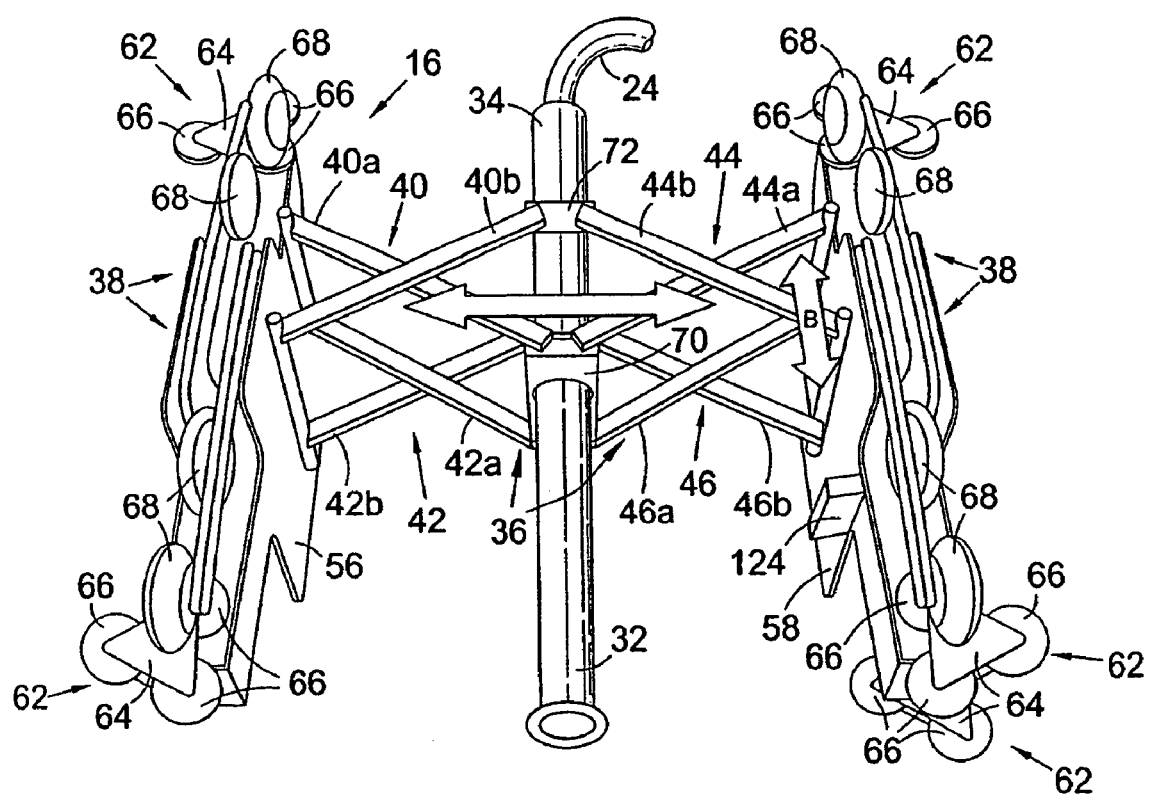
FIG. 3 is an enlarged, detailed front top perspective view of the conduit inspection apparatus of FIG. 1, shown following partial activation of the centralisation assembly of the apparatus.
Figure 4:
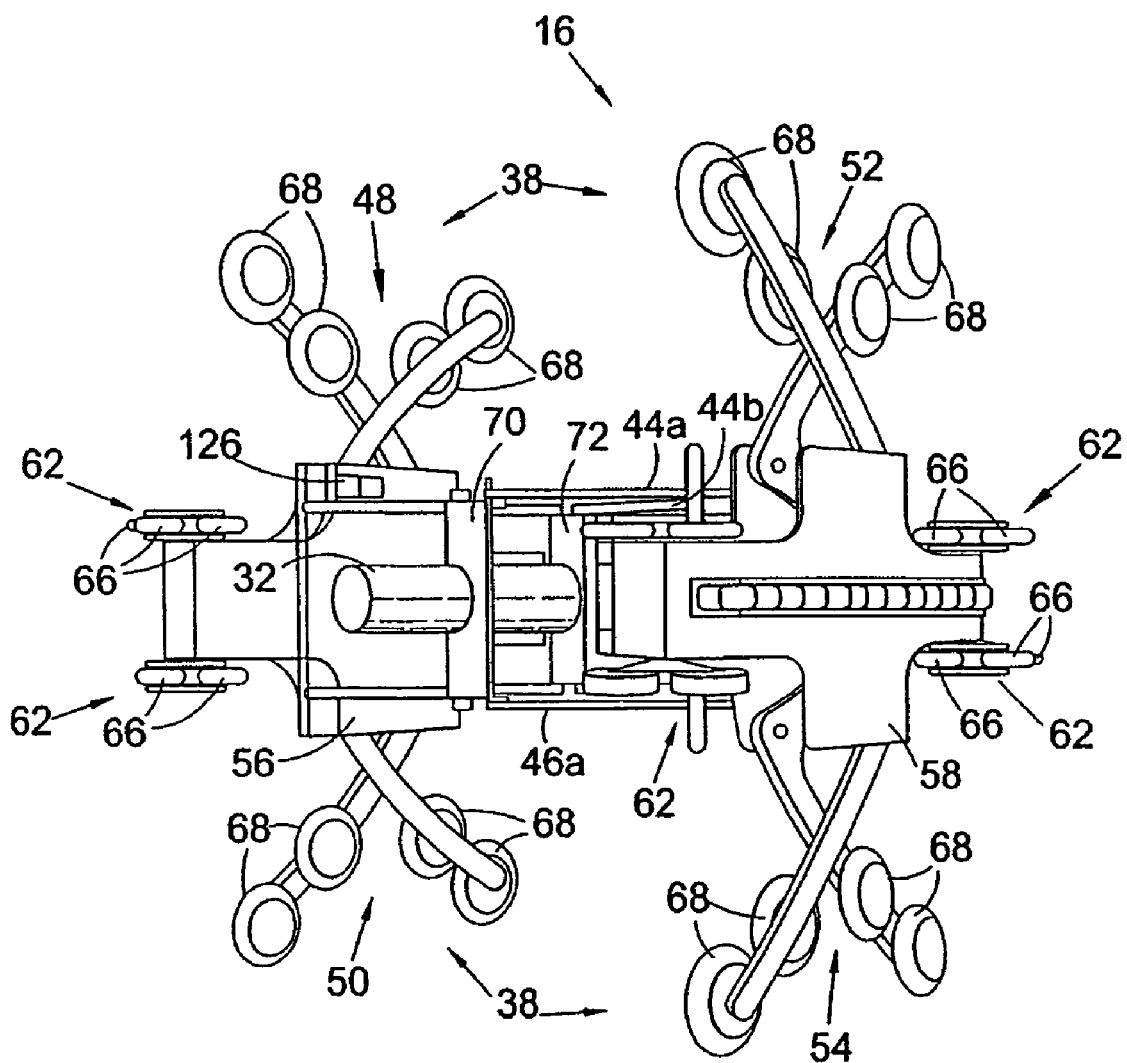
FIG. 4 is an enlarged, detailed front right perspective view of the conduit inspection apparatus of FIG. 1, shown following full activation of the centralisation assembly of the apparatus.

The apparatus 10 is also shown in the enlarged, detailed front right and top perspective views of FIGS. 2 and 3, where the apparatus is shown prior to and following partial activation, respectively, of a centralisation assembly 16 of the apparatus. FIG. 4 is a view of the apparatus following full activation of the centralisation assembly 16.

The inspection apparatus 10 includes a body in the form of body module 18 adapted for location within the duct 14, as shown in FIG. 1. The centralisation assembly 16 is coupled to the body 18 for centralising the body within the duct 14, and a transportation assembly 20, shown in FIG. 1, transports the body along the duct. A data coupling is provided for data communication between the body 18 and a control station 22 (FIG. 1). In the embodiment shown, the data coupling, which will be described in more detail below, is provided within an umbilical cable 24 which forms part of the transportation assembly 20.

The transportation assembly 20 also includes a winch 26 and a drum 28 for reeling the umbilical cable 24, to transport the apparatus 10 along the duct 14. Operation of the winch 26 and drum 28 to reel the umbilical cable 24 is controlled via the control station 22, which includes a personal computer (PC) 30.

Considering the inspection apparatus 10 in more detail, the body module 18 includes a central tube or housing 32 which includes a connector (not shown) for connection with the umbilical cable 24 at a leading end 34 of the tube 32. The centralisation assembly 16 is expandable for centralising the body 32 within the duct 14, and comprises a first set 36 of extendable legs (FIG. 3) and a second set of extendable legs 38 (FIG. 4).

The first set of legs 36 are expandable for centralising the tube 32 within the duct 14 in a horizontal plane, and the apparatus 10 is shown in FIG. 3 following movement of the legs 36 to an extended position. The second set of legs 38 are extendable for centralising the tube 32 within the duct 14 in a vertical plane, and the apparatus 10 is shown in FIG. 4 following movement also of the legs 38 to an extended position.

The first set of legs 36 comprise left and right pairs of legs 40, 42 and 44, 46 arranged in scissors configurations for movement between a retracted position (FIG. 2) and an extended position (FIG. 3). In a similar fashion, the second set of legs 38 comprise left and right pairs of legs 48, 50 and 52, 54 which are moveable between a retracted position (FIG. 2) and an extended position (FIG. 4). Each leg pair 48, 50 and 52, 54 are similarly arranged in a scissors configuration and the leg pairs are mounted on respective side plates 56, 58 of the apparatus 10. The legs 48 are geared relative to the legs 50, and the legs 52 relative to the legs 54, to ensure that the legs move by the same amount on activation. This ensures centralisation in the vertical plane. The legs 40, 42 are geared relative to the legs 44, 46 in a similar fashion, for centralisation in a horizontal plane.

The apparatus 10 also includes devices for measuring dimensions of the duct 14, in the form of width and height potentiometers 124, 126. The width potentiometer 124 (FIG. 3) measures movement of leg 44b along the sideplate 58 through an arm 128, the position of which varies the voltage output of the potentiometer. In a similar fashion, the height potentiometer 126 (FIG. 4) is coupled to a leg of leg pair 48, and measures rotation of the leg through a wiper. This data is analysed by the PC 30 to determine the position of the leg sets 36, 38 and thus the width and height of the duct. In combination with further data concerning direction, inclination and distance travelled by the apparatus 10, this may facilitate generation of a 3D map of the ductwork.

As shown in particular in FIG. 2, the side plates 56, 58 each include a set of side rollers 60 (one shown in the Figure) and four roller devices 62, shown also in FIGS. 3 and 4. Each roller device includes a triangular bogie or pivot plate 64 pivotally mounted to the respective side plate 56, 58, with a wheel 66 at each corner of the bogie. The bogie 64 is free to rotate with respect to the side plates 56, 58 and eases passage of the apparatus 10 through the duct 14, in the event that the apparatus encounters an obstruction such as a seam, flange, nut, bolt or rivet head or the like extending into the duct 14. In a similar fashion, each of the leg pairs 48, 50 and 52, 54 carries a number of wheels 68 for easing passage of the apparatus along the duct 14 both in the retracted and extended positions of FIGS. 2 and 4.

Legs 40a, 42a and 44a, 46a of the leg pairs 40, 42, 44 and 46 respectively are coupled at one end to a sliding collar 70 mounted on the tube 32. The other ends of the arms 40a, 42a and 44a, 46a are connected to the side plates 58, 60. In a similar fashion, legs 40b, 42b, 44b and 46b are mounted at one end to a fixed collar 72 and at the other end are slidably coupled to the side plates 56, 58. The centralisation assembly 16 is pneumatically activated, and a piston (not shown) is coupled to the sliding collar 70 to move the collar in the direction of the arrow B (FIG. 3). By controlling supply of pressurised air to the cylinder, the position of the collar 70 is controlled, in turn controlling movement of the leg pairs 40, 42 and 44, 46 between the retracted position of FIG. 1 and the extended position of FIG. 3.

The legs of the leg sets 48, 50 and 52, 54 are similarly moved between the retracted and extended positions by cylinders (not shown). On full activation (FIG. 4), all of the legs are brought into contact with an internal surface 74 of the duct 14, to centralise the tube 32 within the duct.

Turning now to FIG. 5, there is shown a view of the inspection apparatus 10 similar to that of FIG. 3. A leading end 76 of the tube 32 carries a fluid applicator in the form of a nozzle assembly 78, shown in more detail in the enlarged perspective and sectional views of FIGS. 6 and 7. The nozzle assembly includes a housing 80 defining a main flow passage 82 and four branch outlet passages 84, as shown in FIG. 7. As will be described, the passages 82, 84 allow supply of a coating or cleaning fluid onto an internal surface 74 of the duct. Each outlet passage 84 includes a nozzle 86 for generating a jet of fluid, and the nozzles 86 are each mutually circumferentially spaced at 90° spacings, and inclined with respect to the direction of travel A of the inspection apparatus (FIG. 1).

An imaging device in the form of a camera 88 is mounted in a detachable camera head attachment 92. Four light sources in the form of LEDs 90 (or alternatively two or more halogen bulbs) are spaced around the camera lens in the camera head attachment 92. The attachment 92 includes a releasable jack 94 for electrical connection with a socket 96 in the nozzle housing 80, and thus to the control station 22. This allows power supply to the camera 88 and LEDs 90, as well as transmission of image data from the camera.

FIG. 9 is a longitudinal sectional view of the camera head attachment 92, also illustrating a self-cleaning assembly 98. The self-cleaning assembly 98 includes flow passages 100 formed in a housing 102 of the camera head attachment 92, and a baffle 104 mounted around the housing. Air is supplied along the flow passages 100, and directed by the baffle 104 to form an air curtain in the vicinity of the camera lens 89. This prevents the camera lens 89 from becoming obscured by coating or cleaning fluids, and from any materials present within the duct 14, and keeps the LEDs 90 clean.

As discussed above, the control station 22 is coupled to the inspection apparatus 10 through the umbilical cable 24. As shown in FIG. 10 (presented on the same sheet as FIG. 1), the umbilical cable provides power to the inspection apparatus, data transmission to and from the apparatus, supplies cleaning/coating fluids and pneumatic air supply. Power is provided by positive and negative electrical wires 106, 108; pneumatic air supply to the three cylinders of the centralisation assembly 16 through respective tubes 110, 112 and 114; cleaning/coating fluids through supply tube 116; and data transmission through data cable 118.

The assembly 12 may also include a device (not shown) for measuring distance travelled by the apparatus 10, typically by measuring the length of cable 24 paid out/reeled in. Also, an inclinometer (not shown) may be provided, for measuring an incline/decline in the duct 14, and a compass (not shown) or the like, for determining a direction of travel of the apparatus. This data allows a map of the duct 14 to be generated by the PC 30.

The apparatus 10 fail-safe shuts down in the event, for example, of snagging or lodging in the duct 14. This may be achieved by providing the centralisation assembly 16 with a bleed valve (not shown) which bleeds pressure from the system on shut down, or constantly (requiring constant over-pressure in use).

The method of installation and operation of the inspection apparatus 10 will now be described in more detail. The inspection assembly 12 is brought on site and the inspection apparatus 10 connected to the control station 22 by the umbilical cable 24, as described above. The inspection apparatus 10 is located at the far end (not shown) of the duct 14, for travel towards the near end 120 shown in FIG. 1. This is achieved, for example, by driving a small remote controlled vehicle (not shown) along the duct 14, carrying a winch cable to the far end of the duct. The cable is attached to the inspection apparatus 10, which is then pulled to the far end of the duct.

The centralisation assembly 16 is then activated to move to the expanded position of FIG. 4, thereby centralising the tube 32 in the duct 14 as shown in FIG. 1. Pneumatic air supply to the apparatus through the tubes 110, 112 and 114 is controlled by the control station 22.

The winch 26 and drum 28 are then activated to wind-in the umbilical cable 24, pulling the inspection apparatus 10 along the duct 14. The LEDs 90 and camera 88 are activated to provide an image from inside the duct, which is viewed on the PC monitor 122 and stored on the PC 30.

This allows a skilled operator to determine whether any cleaning or coating of the duct 14 is required, and the particular locations of any problem areas. The inspection apparatus 10 may then be returned to the far end of the duct 14 by deactivating the centralisation assembly 16 and repeating the steps described above.

On a second pass of the inspection apparatus 10 through the duct 14, a cleaning fluid such as disinfectant or antibacterial fluid may be supplied through the tube 116 to clean the duct wall 74, or a coating fluid such as paint, a sealant or a mastic may be applied. Alternatively, paint may be applied in a paint application procedure subsequent to any cleaning procedure.

Simultaneously, the cleaning/coating procedure is monitored by the operator through the camera 88, which is protected from soiling by the air curtain supplied through the air passages 100 and baffle 104.

It will be understood that the cleaning or coating fluid is supplied from the rear end of the inspection apparatus 10, such that passage of the inspection apparatus 10 through the duct 14 does not disturb the applied cleaning or coating fluid.

Figure 11:
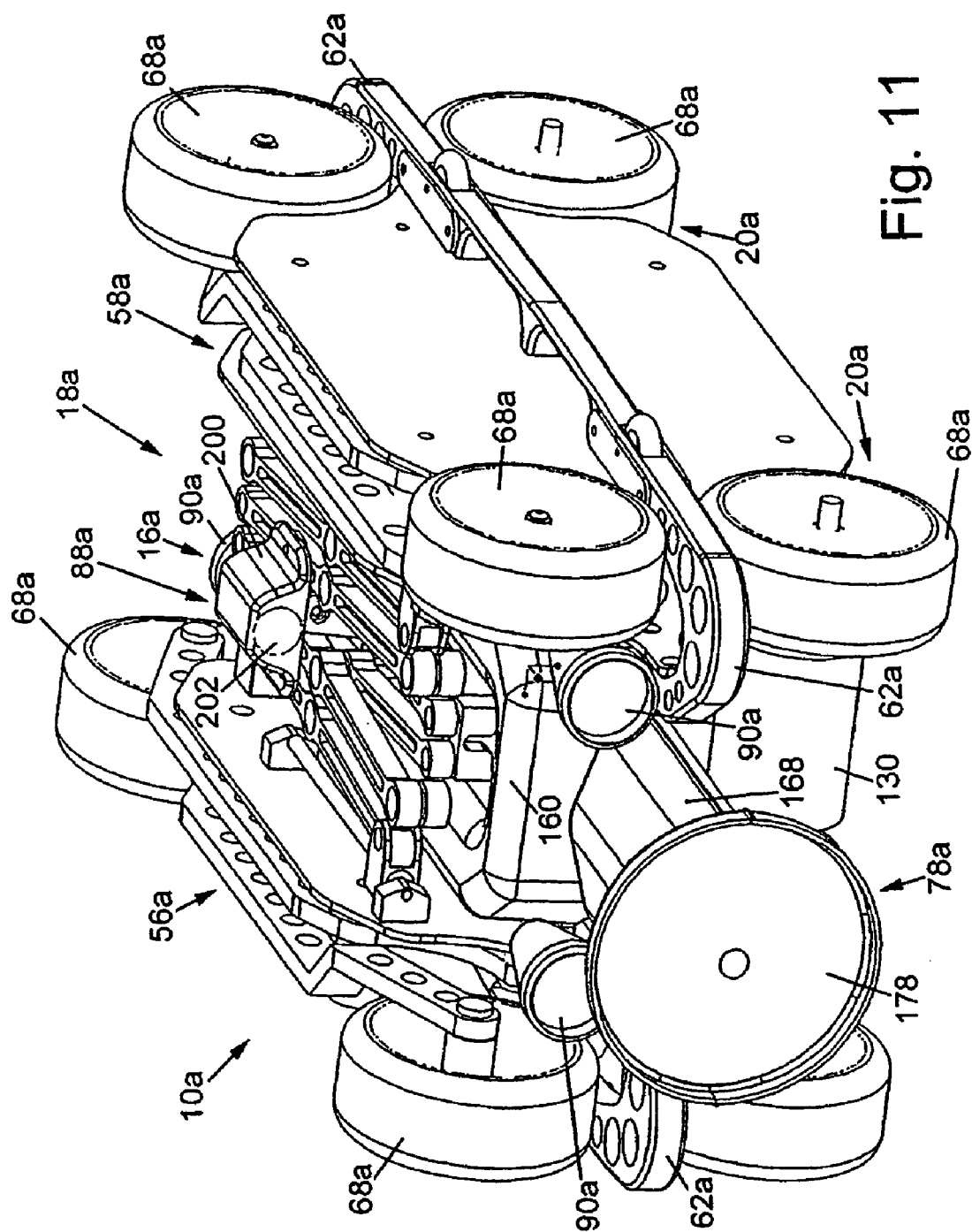
FIG. 11 is a front right perspective view of a conduit inspection apparatus in accordance with a preferred embodiment of the present invention, shown prior to activation of a centralisation assembly of the apparatus.
Figure 12:
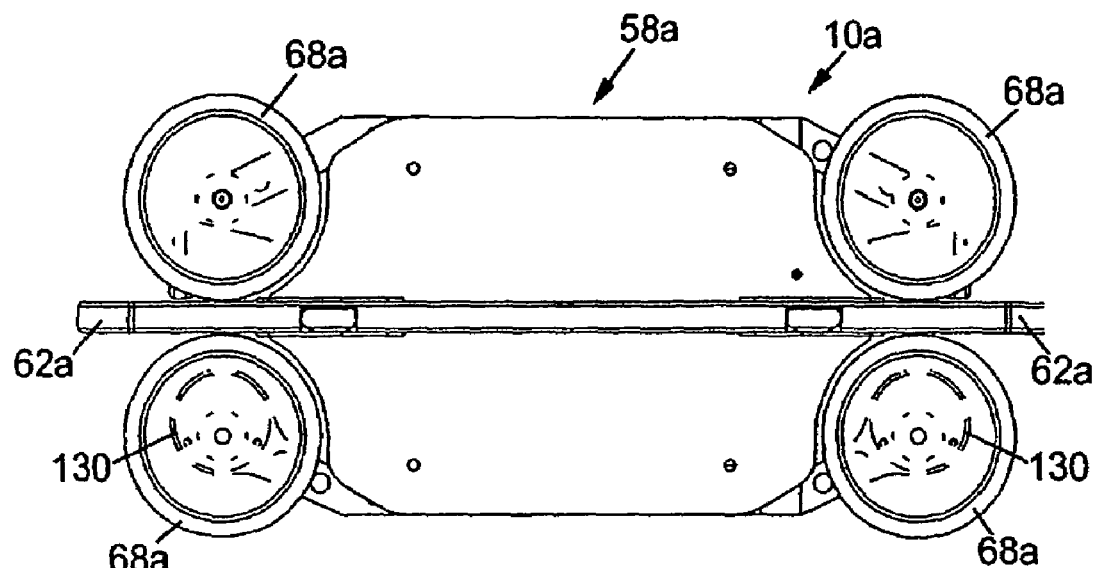
FIGS. 12–15 are side, plan, front end and rear end views of the inspection apparatus of FIG. 11, respectively.
Figure 13:
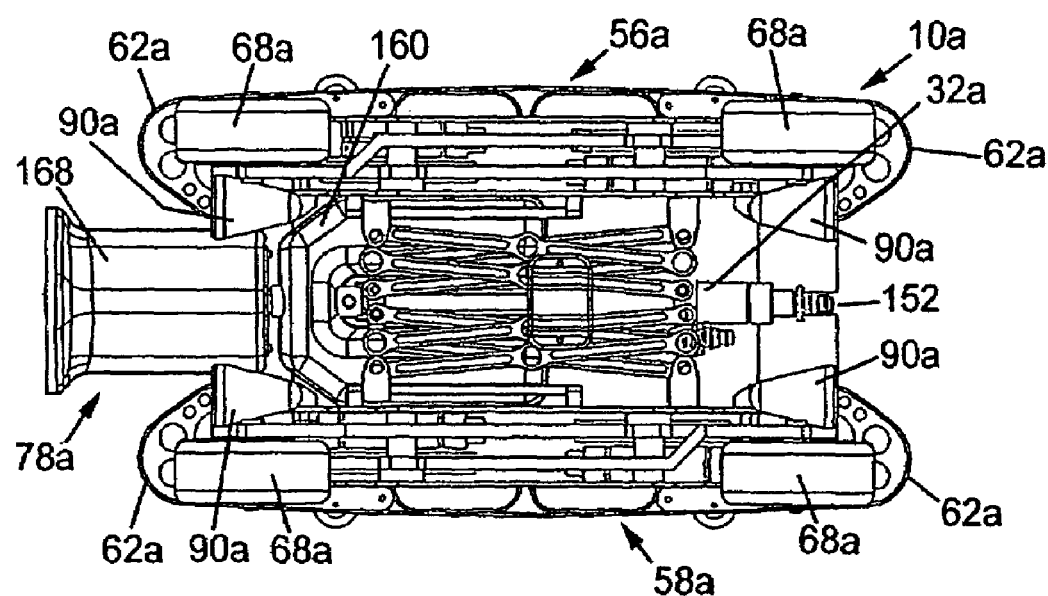
Figure 14:
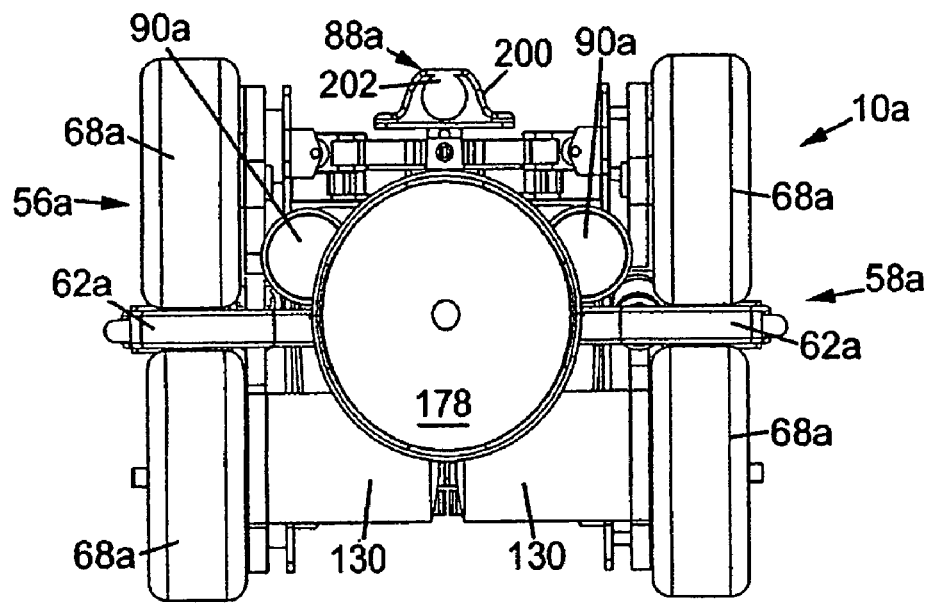
Figure 15:
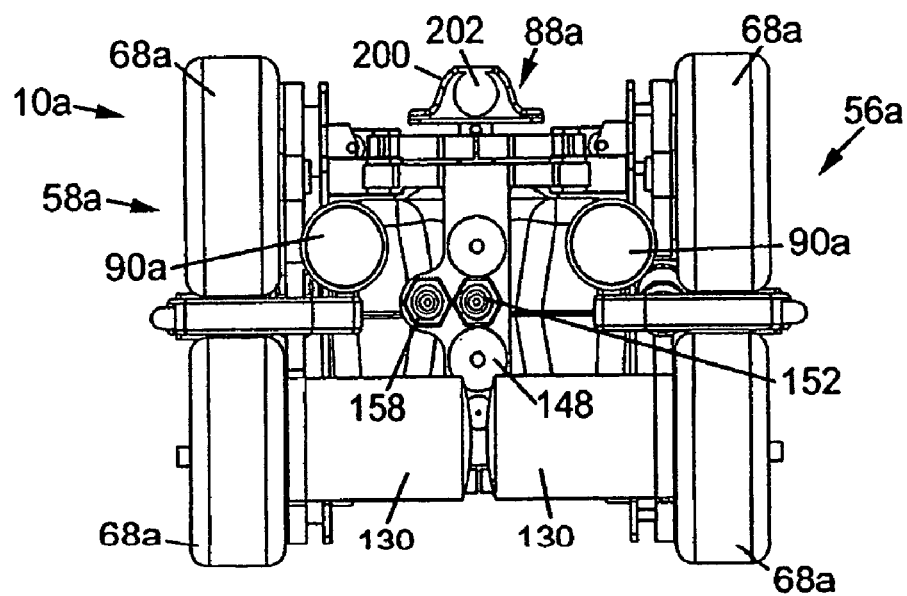

Turning now to FIG. 11, there is shown a perspective view of a conduit inspection apparatus in accordance with a preferred embodiment of the present invention, the inspection apparatus indicated generally by reference numeral 10a. The conduit inspection apparatus 10a forms part of a conduit inspection assembly similar to the assembly 12 shown in FIG. 1, and would thus be provided in place of the inspection apparatus 10. Like components of the inspection apparatus 10a with the inspection apparatus 10 of FIGS. 1–10 share the same reference numerals with the addition of the suffix a.

The inspection apparatus 10a, which is also shown in the side, plan, front end and back end views of FIGS. 12–15, respectively, includes a centralisation assembly 16a coupled to a body module 18a and a transportation assembly 20a. However, whilst the inspection apparatus 10a is connected to a control station similar to the station 22 shown in FIG. 1, the transportation assembly 20a includes motors 130 associated with the wheels 68a provided on the lower half of the apparatus 10a. The motors are controlled and operated by the control station to drive the apparatus 10a along the duct 14, and it will be understood that by varying the operation of the motors 130 on the left or right side of the apparatus 10a, precise directional control can be achieved to manoeuvre the apparatus 10a within the duct 14. Thus it is not necessary to transport the apparatus 10a within the duct 14 using an umbilical cable coupled to the apparatus 10a. However, it will be understood that an umbilical cable is provided for (optionally) controlling operation of the apparatus 10a and for supplying paint and the like, as will be described below. The motors 130 are offset relative to an axle of the wheels 68a to improve ground clearance.

Figure 16:
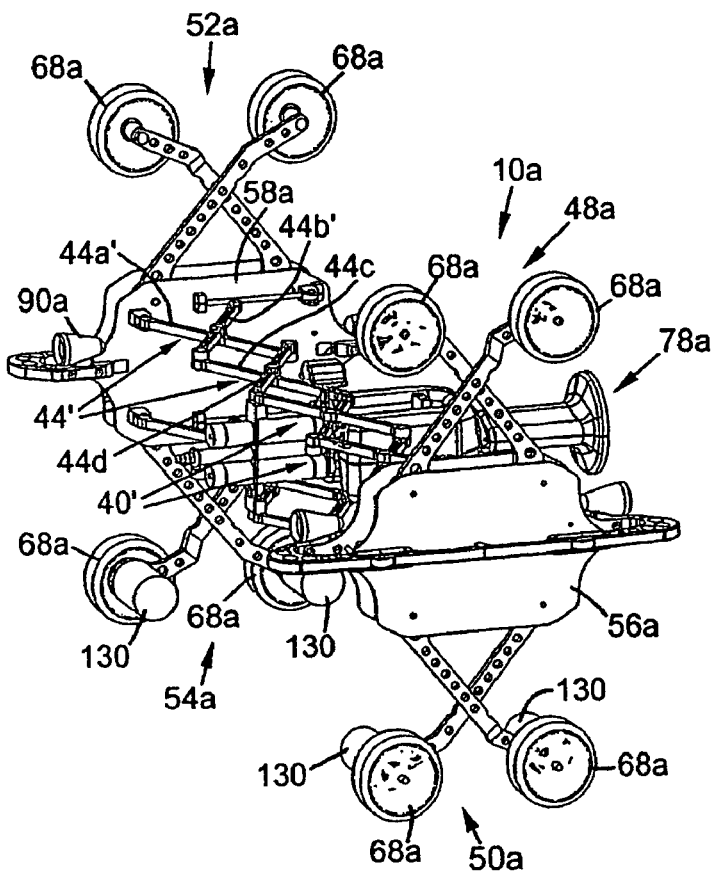
FIGS. 16 and 17 are rear right perspective and front left perspective views of the inspection apparatus of FIG. 10, shown following activation.
Figure 17:
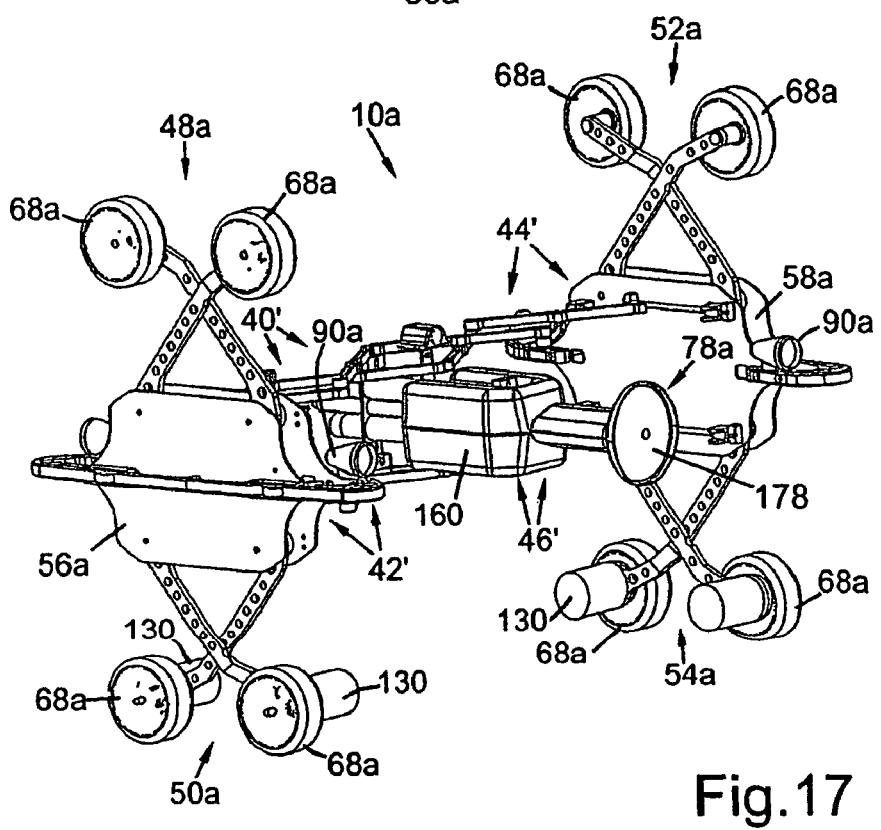
Figure 18:
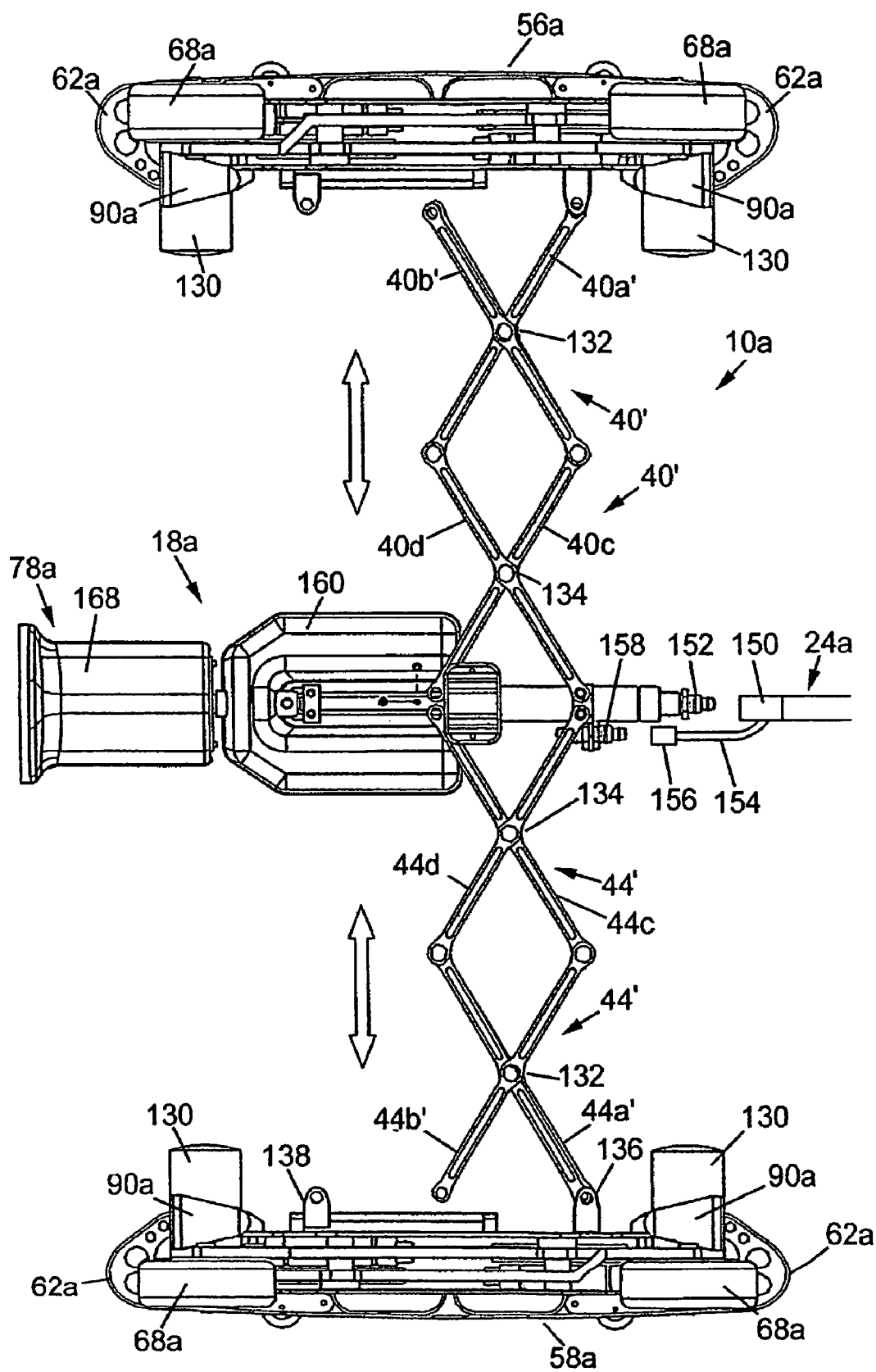
FIG. 18 is a plan view of the inspection apparatus of FIG. 10 following partial activation of the centralisation assembly of the apparatus.

The inspection apparatus 10a is shown in a fully activated state in the rear perspective view of FIG. 16 and the front perspective view of FIG. 17. As shown in FIGS. 16 and 17, the apparatus 10a includes two sets of leg pairs 40', 42', 44' and 46'. FIG. 18, which is a view of the apparatus 10a following partial activation of the centralisation assembly 16a, shows the upper two sets of these leg pairs 40' and 44', and it will be noted that the leg pairs are arranged in a double-scissors configuration. This provides a greater degree of expansion when compared to the apparatus 10. The leg pairs 44' include legs 44a' and 44b' coupled at one end to the side 58a, and which rotate relative to one another about a pivot 132. The legs 44a', 44b' are also coupled to a second set of legs 44c, 44d, coupled about a pivot 134 and secured to a body module 18a of the apparatus 10a. The legs 44a', 44b' are coupled to the side 58a by mountings 136, 138 respectively. However, it will be noted that the leg 44b' has been illustrated disconnected from the mounting 138, for illustration purposes. It will be understood that the leg pairs 40', 42' and 46' are arranged in a similar fashion.

Figure 19:
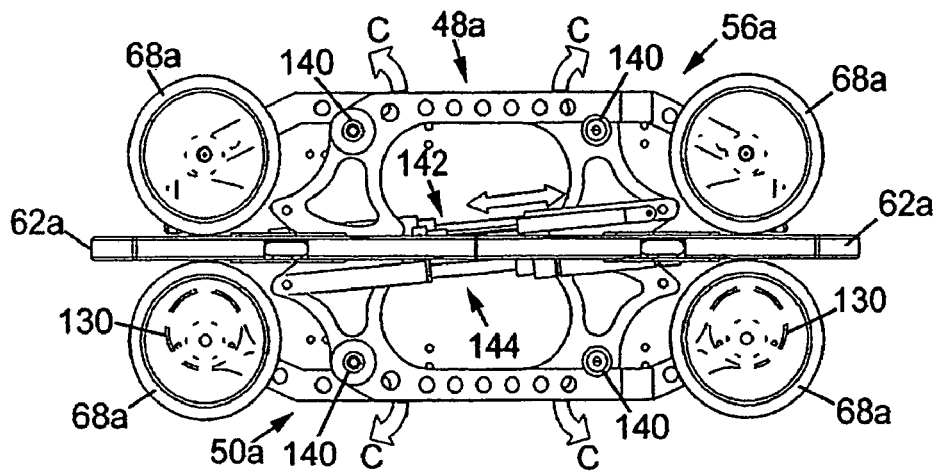
FIG. 19 is a side view of a part of the inspection apparatus of FIG. 11.

The apparatus 10a also includes leg pairs 48a, 50a, 52a and 54a for centralising the apparatus 10a in a vertical plane, as shown in FIGS. 16 and 17. The arrangement of the leg pairs 48a and 50a of the side 56a are also shown in FIG. 19, and it will be noted that the legs of each leg pair 48a, 50a are mounted for rotation about pivots 140. In this fashion, the legs move towards the extended position by rotation about the pivots 140 in the direction of the arrows C shown in FIG. 19. FIG. 19 also illustrates pistons 142, 144 which are operated to move the leg pairs 48a, 50a to the extended position. It will be understood that similar pistons are provided for operating the leg pairs 52a, 54a.

Figure 20:
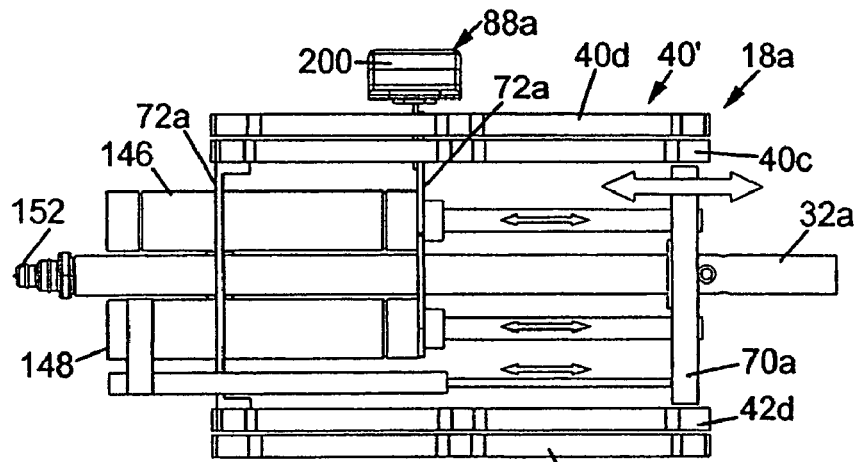
FIG. 20 is a view of a rear part of a body module forming part of the inspection apparatus of FIG. 10.

Turning now to FIG. 20, there is shown a side view of an end part of the body module 18a. The body module 18a carries two pistons 146, 148 for moving the leg pairs 40', 42', 44' and 46' to the extended position. In a similar fashion to the apparatus 10, the pistons 146, 148 are connected by fixed brackets 72a to a central tube 32a, and a sliding collar 70a is mounted around the tube 32a. Activation of the pistons 146, 148 moves the sliding collar 70a relative to the tube 32a. The leg pairs 40', 42', 44' and 46' are coupled to the rear fixed bracket 72a and to the sliding collar 70a, and are moved by actuating the pistons 146, 148.

As shown in FIG. 18, an umbilical 24a is connected to the apparatus 10a, the umbilical 24a having a load bearing female connector 150 for coupling to a corresponding male connector 152 on the body module 18a. A branch 154 extends from the female connector 150 and includes a branch female connector 156 for engaging a branch male connector 158 on the module 18a. This branch 154 provides for supply of paint to the apparatus 10a. In this way, mechanical loading on the umbilical 24a is borne by the connector 150, and not by the branch connector 154. A similar arrangement is provided for pneumatic and electrical connection to the apparatus 10a.

Figure 21:
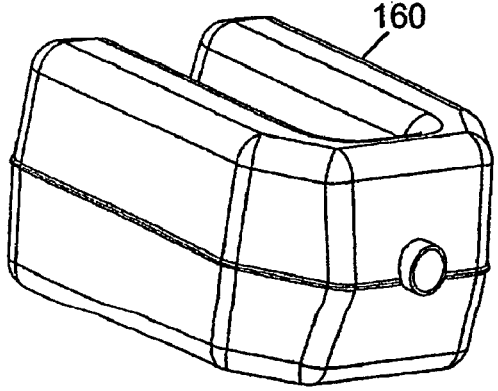
FIGS. 21 and 22 are front left perspective and plan views of the housing forming part of a body module of the inspection apparatus of FIG. 11.
Figure 22:
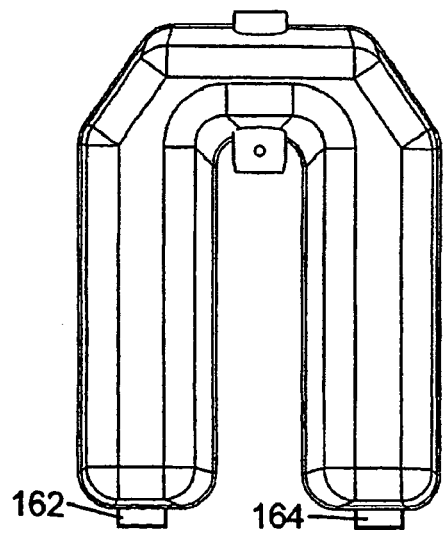

Indeed, turning to FIGS. 21 and 22, there are shown perspective and plan views of a housing 160 which contains control circuitry, valve arrangements and the like for controlling operation of the apparatus 10a. The housing 160 includes pneumatic and electric connection ports 162, 164 for connecting to the branches extending from the connector 150. The housing 160 is releaseably attached to the body module 18a, and provides protection for the relevant circuitry and the like from fluid sprayed onto the duct 14 and from mechanical impact.

The apparatus 10a optionally includes a wireless data coupling, in place of a hard connection, such as the data cable 118 of the apparatus 10. The wireless data coupling includes an appropriate data transmitter/receiver provided within the housing 160, and a transmitter/receiver at the control station 22, for receiving transmitted data and for transmitting control instructions. The wireless data coupling may be based upon a BLUETOOTH™, WI-FI (Trade Mark) or GPRS system, selected according to appropriate operating parameters. These may include an operating range of the apparatus 10a relative to the control station 22, and physical properties of the conduit 14 (such as wall thickness and transmission properties of the conduit material).

The wireless data coupling may therefore serve, for example, for transmitting images of the duct 14 to the control station; transmitting data concerning the dimensions of the duct 14, speed, direction and inclination of the apparatus 10a within the duct to the control station 22; and for transmitting control instructions for controlling movement/operation of the apparatus 10a.

In an alternative embodiment, the camera 88a is a remote camera, and thus may include a transmitter for transmitting images of the duct to the control station 22. The camera may be powered through the electrical connection with the apparatus 10a or by onboard batteries.

Figure 23:
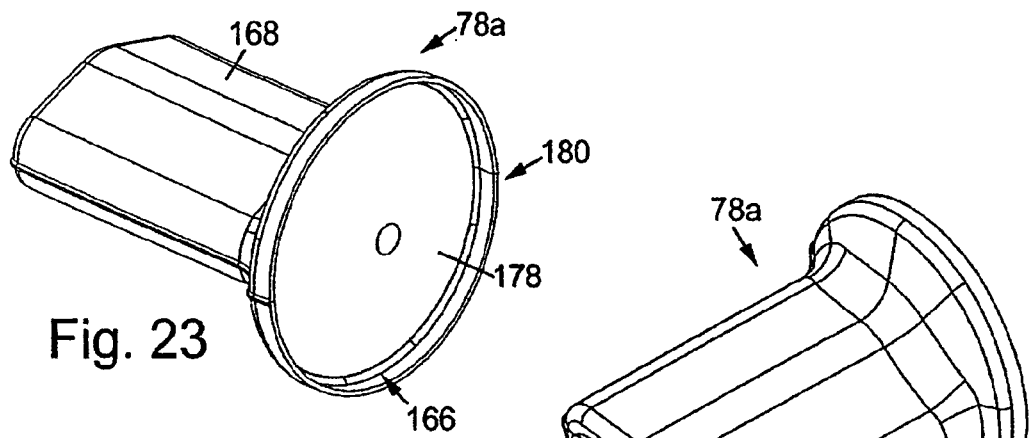
FIGS. 23 to 26 are front left, rear left, partially sectioned rear left and plan views, respectively, of a fluid applicator forming part of the inspection apparatus of FIG. 11, shown in a deactivated position.
Figure 24:
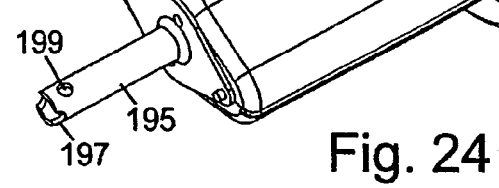
Figure 25:
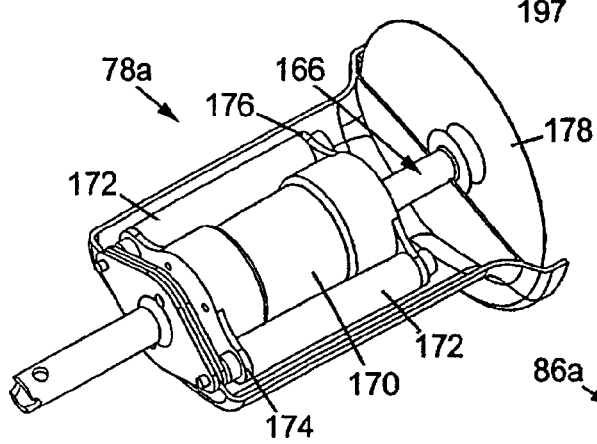
Figure 26:
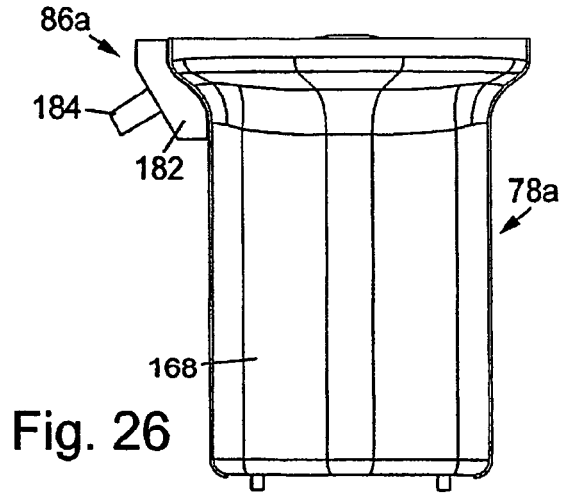

The apparatus 10a also includes a fluid applicator 78a, which is shown more clearly in the front and rear perspective views of FIGS. 23 and 24, as well as the partially cut away perspective view of FIG. 25 and the plan view of FIG. 26. The fluid applicator 78a includes a rotary member in the form of an atomiser 166, which is shown in FIG. 27. The fluid applicator 78a also includes a housing 168, and the atomiser 166 is moveable between a deactivated or stowed position, shown in FIGS. 23–26, and an activated or deployed position, shown in the front perspective, plan and partial sectional views of FIGS. 28–30, respectively.

Prior to location of the apparatus 10a in the duct 14, the atomiser 166 is in the deactivated position, where it resides within the housing 168. This ensures that the atomiser 166 is not damaged during handling, and prevents any potential injury to an operator.

The fluid applicator 78a also includes a motor 170 for driving and rotating the atomiser 166, and two pistons 172, for moving the atomiser 166 between the deactivated and the activated positions. The motor 170 and pistons 172 are mounted between brackets 174, 176 and are moveable within the housing 168. On activation of the pistons 172, the atomiser 166 is moved to the activated position of FIGS. 28 to 30, such that a disc 178 of the atomiser protrudes from an end 180 of the housing 168. The atomiser 166 is spring biased towards the deactivated position. In this fashion, when pressure is bled from the pistons 172 and indeed when the pistons are in the deactivated position shown in FIG. 25, the atomiser 166 is urged to the deactivated, stowed position. The apparatus 10a is arranged such that the pistons 172 are only activated to urge the atomiser 166 to the activated position when the motor 170 has been activated. This provides a fail-safe ensuring the atomiser 166 is returned to the deactivated position when it is not required.

The fluid applicator 78a also includes a nozzle 86a coupled to the housing 168, as shown in FIGS. 26 and 29. The nozzle 86a includes a connecting body 182 and a removable jet portion 184 secured to the body 182 and extending through the housing 168. This allows the jet 184 to be removed for cleaning purposes and the like.

As shown in FIG. 29, when the atomiser 166 has been moved to the activated position, a jet 186 of paint or the like may be directed onto an inner surface 188 of the atomiser disc 178, in the direction of the arrow D. Rotation of the disc 178 causes the paint to be ejected in the direction of the arrows E and onto the internal surface 74 of the duct 14. It has been found that the atomiser 166 provides a particularly efficient method of coating the duct internal surface 74.

The atomiser 166 also includes a small inner shield disc or ring 190 on a shaft 192 of the atomiser 166. This inner ring 190 prevents passage of paint along the shaft 192 and into the motor 170, as any paint collecting in the area 194 tends to travel onto the inner ring 190, which ejects the paint in the direction of the arrow E.

The fluid applicator 78a is provided as a removable attachment connected to the tube 32a of the body module 18a by a support shaft 195 shown, for example, in FIGS. 24 and 25. The shaft 195 includes a notch 197 for engaging a locator pin (not shown) and an aperture 199 for receiving a locking pin, to secure the fluid applicator 78a to the body module 18a. This allows the applicator 78a to be removed for cleaning/maintenance or to be replaced with an alternative tool, such as an abrasive cleaning tool.

Figure 31:
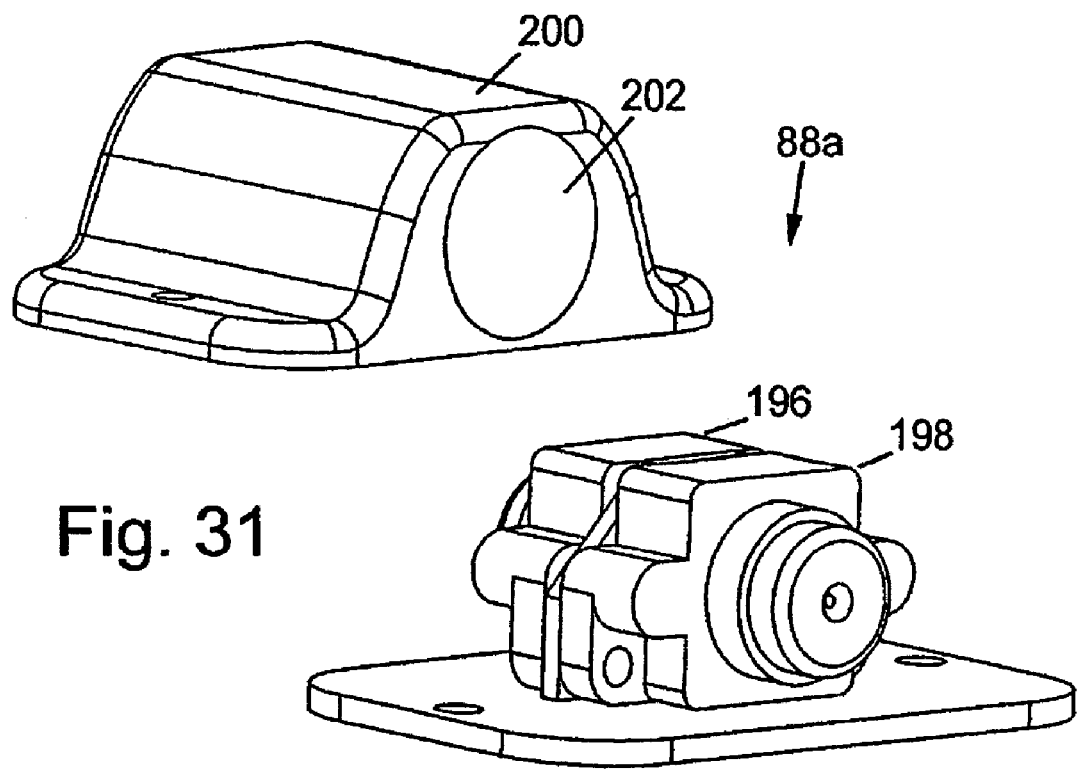
FIG. 31 is an exploded perspective view of an imaging assembly forming part of the inspection apparatus of FIG. 11.

Turning now to FIG. 31, there is shown an exploded perspective view of a camera assembly 88a of the apparatus 10a. The camera assembly 88a differs from the camera 88 of the apparatus 10 in that it includes two separate cameras 196, 198 provided back to back, for viewing in both directions along the duct 14. The camera assembly 88a includes a cover 200 carrying lenses 202 (one shown) which cover and protect the cameras 196, 198. The apparatus 10a also includes lights 90a on both ends of the apparatus, for viewing the duct 14 in either direction.

The apparatus 10a also includes bumpers or sliders 62a, typically of a plastics or polymeric material such as a nylon or PTFE, for easing passage of the apparatus 10a around corners and over obstacles in the duct 14.

The method of operation of the apparatus 10a is the same as the apparatus 10 of FIGS. 1–10, save that the apparatus 10a is self-driven along the duct 14, as described above.

Figure 32:
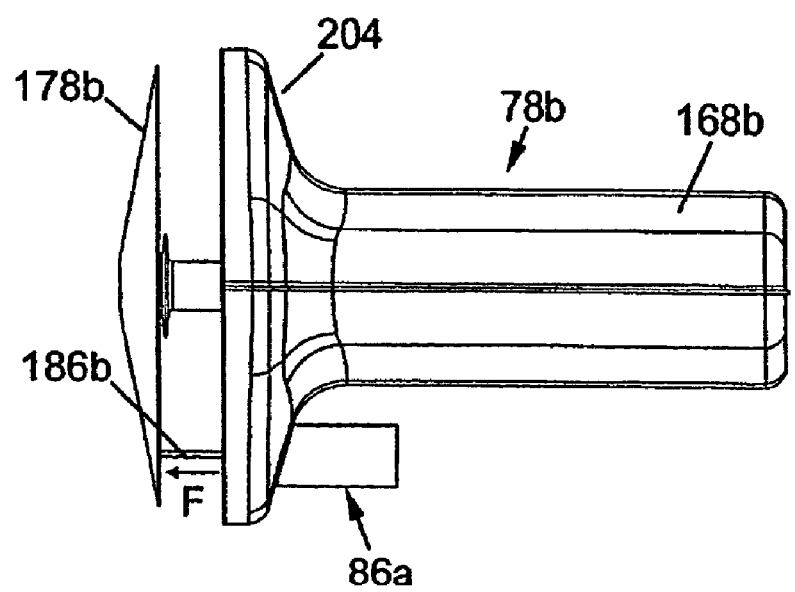
FIG. 32 is a plan view of an alternative fluid applicator for the inspection apparatus of FIG. 11.

Turning now to FIG. 32, there is shown an alternative fluid applicator 78b. The applicator 78b is similar to the applicator 78a of FIGS. 23 to 30, except the applicator 78b includes a nozzle assembly 86a which is located behind a flared portion 204 of housing 168b that accommodates the atomiser disc 178b. Location of the nozzle assembly 86a in this position prevents damage to the nozzle assembly during operation of the apparatus 10a due, for example, to striking an obstacle in the duct 14. The nozzle assembly 86a directs a jet 186b of paint or the like in the direction of the arrow F onto the atomiser disc 178b, from where it is ejected in a similar fashion to that described above.

Figure 33:
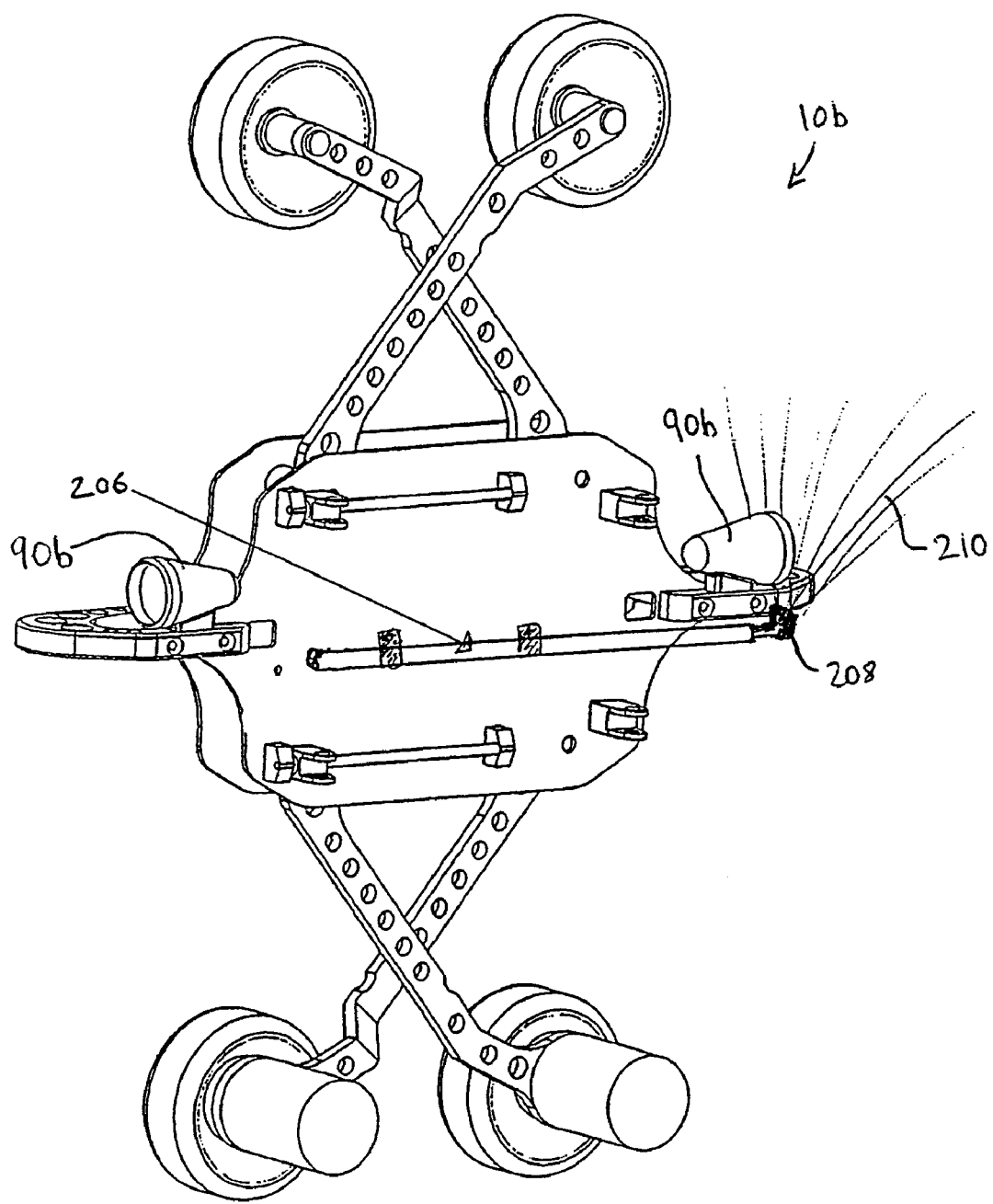
FIG. 33 is a perspective view of part of a conduit inspection apparatus in accordance with an alternative embodiment of the present invention, shown activated and in use.

Turning finally to FIG. 33, there is shown a perspective view of part of a conduit inspection apparatus in accordance with an alternative embodiment of the present invention, the apparatus indicated generally by reference numeral 10b. The apparatus 10b is similar to the apparatus 10a of FIGS. 11 to 32, and like components share the same reference numerals as the apparatus 10a, with suffix a replaced by suffix b.

The apparatus 10b is thus of similar structure to the apparatus 10a, however, the apparatus 10b includes a self-cleaning assembly 78b comprising a hose 206 having a nozzle 208. The hose 206 extends along an umbilical (not shown) similar to the umbilical 24a, and directs a jet 210 of air through the nozzle 208, to clean the LEDs 90b (two shown) of the apparatus 10. It will be understood that a camera (not shown) of the apparatus 10b may be located in a position where the jet 210 cleans the camera; that the nozzle 208 may be located in an alternative position, so as to clean the camera; or that a number of nozzles 208/hoses 206 may be provided.

Various modifications may be made to the foregoing without departing from the spirit and scope of the present invention.

For example, a combination cleaning/coating fluid may be applied, or the apparatus may include separate nozzles for supplying a cleaning fluid and then a coating fluid in a combined procedure, the coating nozzles located rearwardly of the cleaning nozzles.

The light source may alternatively comprise a filament, fluorescent or halogen light.

The nozzle may comprise an integral part of the body. In a particular embodiment, the nozzle may be adapted to supply an electrostatic paint, polarised to be attracted towards an internal surface of the duct. The nozzle may be adapted for rotation, for example, about an axis of the apparatus, either in response to supplied fluid or by actuation, such as by movement of the body through the conduit through a gear or other mechanical assembly, or in response to application of a control signal.

The apparatus may comprise a nozzle in the form of a rotary atomiser. The atomiser may be adapted for rotation to supply fluid to the conduit, such rotation atomising the fluid according to the centrigual principle.

The apparatus may further comprise cleaning apparatus such as one or more abrasive brush, blade, tooth, scraper or combination thereof for cleaning an internal surface of the conduit.

The centralisation assembly may include sensors for detecting location of the body within the conduit and may be adapted to adjust the position of the body to maintain the body centrally within the conduit.

The cable may possess sufficient rigidity to enable the body to be pushed along the conduit using the cable. Alternatively, the body may comprise or be coupled to a transportation assembly for self-propelling the body along the conduit, which may comprise driven wheels, tracks or the like.

The cables/tubes may be provided separately instead of in a single umbilical cable.

The apparatus may further comprise an environmental sampling device, which may include one or more of a swab, fluid and air sampling devices.

The legs of the centralisation assembly may be extendable to provide adjustment for use of the apparatus in a wider range of conduits of different dimensions. The legs may be telescopic or may include extension pieces/sections for increasing or decreasing the leg length.

The imaging device may be mounted on an extension arm and located adjacent the fluid applicator, at a leading/trailing end of the apparatus (depending upon the direction of travel), or may be located extending through the nozzle assembly/atomiser.

In an alternative, an apparatus may be provided including both a rotary member (atomiser) and a nozzle/nozzle assembly for applying a fluid directly to an internal surface of a conduit. For example, a nozzle assembly may be provided for applying a cleaning fluid, and an atomiser for applying a coating fluid, or vice-versa.

The apparatus may be linked to a global positioning system (GPS) to determine a location of the apparatus within a conduit, which may facilitate generation of a map of the conduit. The apparatus may therefore include an appropriate receiver, linked to the control station by the data coupling, to receive signals from GPS satellites.

We claim:

1. Conduit inspection apparatus comprising:
    a body adapted for location within a conduit;
    a centralisation assembly coupled to the body and configured for centralising the body within the conduit;
    a transportation assembly coupled to the body and configured for transporting the body along the conduit;
    a data coupling coupled to the body for data communication between the body and a control station;
    a fluid applicator coupled to the body and configured for supplying a fluid to a surface of the conduit, the fluid applicator comprising an atomiser which is movable between a deactivated position and an activated position, wherein the atomiser can supply the fluid to the surface of the conduit when in the activated position; and
    a housing coupled to the body and configured for storing the atomiser when in the deactivated position.

2. Apparatus as claimed in claim 1, wherein the atomiser imparts a force on the fluid to direct the fluid towards a surface of the conduit.

3. Apparatus as claimed in claim 2, wherein the atomiser comprises a main disc for imparting a force on the fluid.

4. Apparatus as claimed in claim 3, wherein the atomiser includes a secondary shield disc spaced from the main disc along a shaft of the atomiser, the secondary disc serving to prevent passage of fluid along the atomiser shaft.

5. Apparatus as claimed in claim 1, wherein the atomiser is biased towards the deactivated position.

6. Apparatus as claimed in claim 1, wherein the atomiser is configured to be selectively urged towards the activated position.

7. Apparatus as claimed in claim 6, wherein the apparatus comprises at least one piston for urging the atomiser to the activated position.

8. Apparatus as claimed in claim 6, wherein the apparatus is arranged such that the atomiser is only urged to the activated position when it is rotated.

9. Apparatus as claimed in claim 8, wherein the fluid applicator includes a motor for rotating the atomiser, and at least one piston for urging the atomizer to the activated position, and wherein the at least one piston is arranged to urge the atomiser to the activated position when the motor is activated.

10. Apparatus as claimed in claim 1, wherein the fluid applicator is coupled to the body and located such that centralisation of the body within the conduit centralises the fluid applicator within the conduit.

11. Apparatus as claimed in claim 1, wherein the fluid applicator is releasably coupled to the body.

12. Apparatus as claimed in claim 1, wherein the fluid applicator further comprises at least one fluid nozzle adapted to direct fluid onto the atomiser.

13. Apparatus as claimed in claim 1, comprising at least one imaging device coupled to the body and configured for viewing the inside of the conduit.

14. Apparatus as claimed in claim 13, wherein the imaging device is connected to the data coupling for outputting a real-time image of the inside of the conduit.

15. Apparatus as claimed in claim 13, wherein the imaging device is a remote camera having a transmitter for transmitting an image of the inside of the conduit to the control station.

16. Apparatus as claimed in claim 1, comprising a first imaging device coupled to the body and configured for viewing in a first direction along the conduit; and
    at least one further imaging device coupled to the body and configured for viewing in a second, opposite direction along the conduit.

17. Apparatus as claimed in claim 1, comprising at least one light source coupled to the body and configured for illuminating the conduit.

18. Apparatus as claimed in claim 1, comprising a self-cleaning assembly for maintaining at least part of the apparatus clean.

19. Apparatus as claimed in claim 18, wherein the self-cleaning assembly includes a passage for supplying a cleaning medium to said at least part of the apparatus.

20. Apparatus as claimed in claim 18, wherein the self-cleaning assembly includes at least one nozzle for directing a jet of cleaning medium onto or near said at least part of the apparatus.

21. Apparatus as claimed in claim 1, wherein the centralisation assembly is moveable between retracted and extended positions for centralising the body within the conduit.

22. Apparatus as claimed in claim 21, wherein the centralisation assembly includes a first set of legs movable to an extended position for centralising the body in a first plane and a second set of legs movable to an extended position for centralising the body in a second plane.

23. Apparatus as claimed in claim 21, wherein the apparatus includes a fail-safe mechanism for de-activating the centralisation assembly to the retracted position.

24. Apparatus as claimed in claim 23, wherein the centralisation assembly is fluid actuated and the fail-safe mechanism includes a valve for bleeding pressure from the centralisation assembly.

25. Apparatus as claimed in claim 1, wherein the centralisation assembly includes sensors for detecting the location of the body with respect to the conduit, and wherein the centralisation assembly is adapted to adjust the position of the body to maintain the body centrally within the conduit.

26. Apparatus as claimed in claim 1, comprising at least one slider member, for assisting passage of the apparatus along the conduit.

27. Apparatus as claimed in claim 1, comprising a roller device having a plurality of wheels mounted on a plate which is pivotally coupled relative to the centralisation assembly, for assisting passage of the apparatus along the conduit.

28. Apparatus as claimed in claim 1, wherein the body is self-driven and the transportation assembly comprises at least one drive wheel.

29. Apparatus as claimed in claim 1, wherein the transportation assembly comprises a cable coupled to the body for transporting the body along the conduit.

30. Apparatus as claimed in claim 1, comprising a cable bundle including two or more of an electrical connection; a cleaning fluid supply; a coating fluid supply; a data cable; a pneumatic power supply; and a hydraulic power supply.

31. Apparatus as claimed in claim 30, wherein the cable bundle is provided as an umbilical cable including a connector for facilitating quick connection of the bundle to the body.

32. Apparatus as claimed in claim 1, comprising at least one measuring device coupled to the body and configured for measuring at least one internal dimension of the conduit.

33. Apparatus as claimed in claim 32, comprising a potentiometer for providing an electrical signal indicative of a position of the centralisation assembly.

34. Apparatus as claimed in claim 1, comprising at least one of a device for sensing distance travelled by the body; an inclinometer for determining the angle of the body; and a sensor for determining direction of travel of the body.

35. Apparatus as claimed in claim 1, comprising an environmental sampling device coupled to the body and configured for taking an environmental sample inside the conduit.

36. Apparatus as claimed in claim 1, wherein the data coupling is a wireless data coupling.

37. Apparatus as claimed in claim 36, wherein the apparatus comprises a data transmitter and a data receiver, for transmitting data to the control station and for receiving data from the control station, respectively.

38. A conduit inspection assembly comprising:
   conduit inspection apparatus as claimed in claim 1; and
   a control station coupled to the conduit inspection apparatus via the data coupling, for controlling operation of the conduit inspection apparatus.

39. A method of inspecting a conduit, the method comprising the steps of:
   locating a conduit inspection apparatus body within the conduit;
   centralising the body within the conduit;
   coupling the body to a control station by a data coupling;
   moving an atomiser of a fluid applicator from a deactivated position where the atomiser is stored in an atomizer housing to an activated position;
   with the atomiser in the activated position, using the atomiser to supply a fluid to the surface of the conduit; and
   translating the body along the conduit.

40. A method as claimed in claim 39, comprising viewing an image of the inside of the conduit using an imaging device.

41. A method as claimed in claim 39, comprising cleaning the conduit by removing any material adhered to an internal wall of the conduit.

42. A method as claimed in claim 41, comprising removing material by jetting cleaning fluid onto the internal wall of the conduit.

43. A method as claimed in claim 39, comprising applying a time-setting coating fluid to an internal surface of the conduit.

* * * * *